United States Patent
Inagaki et al.

(10) Patent No.: US 9,632,177 B2
(45) Date of Patent: Apr. 25, 2017

(54) OBJECT DETECTING APPARATUS

(71) Applicant: HONDA MOTOR CO., LTD., Minato-Ku, Tokyo (JP)

(72) Inventors: Hiromi Inagaki, Tochigi-Ken (JP); Hiroyuki Yamashita, Utsunomiya (JP); Tsunehiko Fukatsu, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 326 days.

(21) Appl. No.: 14/287,624

(22) Filed: May 27, 2014

(65) Prior Publication Data
US 2014/0355385 A1    Dec. 4, 2014

(30) Foreign Application Priority Data

May 30, 2013  (JP) .................................. 2013-113861

(51) Int. Cl.
*G01S 15/02*  (2006.01)
*G01S 15/93*  (2006.01)
(Continued)

(52) U.S. Cl.
CPC .......... *G01S 15/02* (2013.01); *G01S 7/52004* (2013.01); *G01S 15/876* (2013.01); *G01S 15/878* (2013.01);
(Continued)

(58) Field of Classification Search
CPC .......... G01S 7/52004; G01S 2015/938; G01S 2015/932; G01S 15/02; G01S 15/931; G01S 15/876
See application file for complete search history.

(56) References Cited

U.S. PATENT DOCUMENTS 4,542,489 A * 9/1985 Naruse ................... G08B 29/04
340/516
4,910,512 A   3/1990 Riedel
(Continued)

FOREIGN PATENT DOCUMENTS

DE           199 24 755 A1    11/2000
DE      10 2005 013 589 A1     9/2006
(Continued)

OTHER PUBLICATIONS

Office Action dated Feb. 3, 2015 issued in the corresponding Japanese Patent Application 2013-113861 with the English translation of pertinent portion.
(Continued)

Primary Examiner — Hovhannes Baghdasaryan
(74) Attorney, Agent, or Firm — Carrier Blackman & Associates, P.C.; Joseph P. Carrier; Jeffrey T. Gedeon

(57) ABSTRACT

An object detecting apparatus includes a first transmission and reception unit having a first transmitter and a first receiver, a second transmission and reception unit having a second transmitter and a second receiver, and a failure judging section. The first receiver produces a first output signal corresponding to a transmission wave, which is transmitted directly from the second transmitter to the first receiver. The second receiver produces a second output signal corresponding to a transmission wave, which is transmitted directly from the first transmitter to the second receiver. Using at least one of the first output signal and the second output signal, the failure judging section judges whether a failure of the first transmitter or the second receiver has occurred, or judges whether a failure of the first transmission and reception unit or the second transmission and reception unit has occurred.

7 Claims, 19 Drawing Sheets

(51) Int. Cl.
*G01S 7/52* (2006.01)
*G01S 15/87* (2006.01)

(52) U.S. Cl.
CPC ....... *G01S 15/931* (2013.01); *G01S 2015/932* (2013.01); *G01S 2015/938* (2013.01)

(56) References Cited

U.S. PATENT DOCUMENTS

| | | | | |
|---|---|---|---|---|
| 5,235,315 | A * | 8/1993 | Cherry | B60Q 9/008 340/435 |
| 5,574,426 | A * | 11/1996 | Shisgal | B60Q 9/007 180/271 |
| 5,689,250 | A * | 11/1997 | Kremser | G01S 7/527 340/435 |
| 6,765,491 | B1 | 7/2004 | Nass | |
| 2002/0044080 | A1 * | 4/2002 | Shirai | G01S 13/931 342/70 |
| 2002/0047780 | A1 | 4/2002 | Nishimoto et al. | |
| 2008/0312834 | A1 | 12/2008 | Noda et al. | |
| 2009/0049905 | A1 * | 2/2009 | LaWhite | G01P 5/24 73/170.13 |
| 2009/0207006 | A1 | 8/2009 | Richter et al. | |

FOREIGN PATENT DOCUMENTS

| | | |
|---|---|---|
| EP | 0 312 845 A1 | 4/1989 |
| EP | 2 090 898 A1 | 8/2009 |
| EP | 2 418 507 A1 | 2/2012 |
| JP | 03-110490 A | 5/1991 |
| JP | 09-140713 A | 6/1997 |
| JP | 2004-345401 A | 12/2004 |
| JP | 2005-153617 A | 6/2005 |
| JP | 2005-233745 A | 9/2005 |
| JP | 2008-307999 A | 12/2008 |
| JP | 2009-186449 A | 8/2009 |
| JP | 2009-222445 A | 10/2009 |
| JP | 2010-210412 A | 9/2010 |

OTHER PUBLICATIONS

Partial European Search Report dated Oct. 16, 2014 issued over the corresponding EP Patent Application No. 14170391.8.

* cited by examiner

# OBJECT DETECTING APPARATUS

CROSS-REFERENCE TO RELATED APPLICATION

This application is based upon and claims the benefit of priority from Japanese Patent Application No. 2013-113861 filed on May 30, 2013, the contents of which are incorporated herein by reference.

BACKGROUND OF THE INVENTION

Field of the Invention

The present invention relates to an object detecting apparatus for emitting a transmission wave toward an area in which an object to be detected may appear, and for detecting the distance up to the object based on a reflection wave that is the transmission wave reflected from the object.

Description of the Related Art

According to Japanese Laid-Open Patent Publication No. 2009-222445 (hereinafter referred to as "JP 2009-222445 A"), an object of the disclosed invention is to provide an ultrasonic distance sensor system for measuring the distance up to a short-range object highly frequently with a single sensor having a wide measurement range (see paragraph [0005], Abstract). To achieve this object, according to JP 2009-222445 A, the ultrasonic distance sensor system includes a transmitting device 2 for transmitting ultrasonic waves toward an object, a driving circuit (microcomputer 16) for outputting a drive signal to the transmitting device 2, a receiving device 3 for receiving reflection waves from the object, and a signal processing circuit (microcomputer 16) for detecting the distance up to the object based on a signal from the receiving device 3. The signal processing circuit generates transmission waves based on a plurality of transmission patterns, and calculates the distance up to the object based on a correlation between the transmission patterns and the signal from the receiving device 3 (see Abstract).

Further, according to JP 2009-222445 A, the ultrasonic distance sensor system performs a short-range distance measuring process and a long-range distance measuring process concurrently based on a plurality of transmission signal patterns. More specifically, the ultrasonic distance sensor system generates a transmission signal pattern having a shorter period in the short-range distance measuring process, as well as a transmission signal pattern having a longer period in the long-range distance measuring process (see paragraph [0013], FIG. 2).

Although JP 2009-222445 A reveals a short-range distance measuring process and a long-range distance measuring process using ultrasonic waves, the reference does not address the detection of failures in the ultrasonic sensors. There are instances in which multiple ultrasonic sensors are used in a vehicle for ensuring fail-safe operation of the vehicle. However, JP 2009-222445 A is silent concerning the detection of failures in the case that a plurality of ultrasonic sensors are used. Detection of failures generally is required not only for such ultrasonic sensors, but also is required in connection with a transmission and reception unit, or a contactless range detection sensor including a transmitter for emitting transmission waves and a receiver for receiving reflection waves produced in response to the transmission waves.

SUMMARY OF THE INVENTION

An object of the present invention is to provide an object detecting apparatus, which includes a plurality of transmission and reception units and is capable of easily detecting failures in each of the transmission and reception units.

According to the present invention, an object detecting apparatus is provided, comprising a first transmission and reception unit and a second transmission and reception unit each having a transmitter configured to emit a transmission wave to an area in which an object to be detected may appear, and a receiver configured to receive a reflection wave reflected from the object when the transmission wave is applied to the object, a distance detector configured to detect a distance up to the object based on a delay time from a time at which the transmitter emits the transmission wave to a time at which the receiver receives the reflection wave, with respect to each of the first transmission and reception unit and the second transmission and reception unit, and a failure judging section configured to judge whether a failure of the first transmission and reception unit and the second transmission and reception unit has occurred. In the object detecting apparatus, an output signal produced from a first receiver, which is the receiver of the first transmission and reception unit, based on the transmission wave that is transmitted directly from a second transmitter, which is the transmitter of the second transmission and reception unit, to the first receiver, is defined as a first output signal. Further, an output signal produced from a second receiver, which is the receiver of the second transmission and reception unit, based on the transmission wave that is transmitted directly from a first transmitter, which is the transmitter of the first transmission and reception unit, to the second receiver, is defined as a second output signal. Using at least one of the first output signal and the second output signal, the failure judging section judges whether a failure of the first transmission and reception unit and the second transmission and reception unit has occurred.

According to the present invention, using at least one of the first output signal from the first receiver and the second output signal from the second receiver, the failure judging section judges whether a failure of the first transmission and reception unit and the second transmission and reception unit has occurred. Therefore, it is possible to determine the occurrence of a failure easily.

The failure judging section may judge that a failure has occurred in the first transmitter or the second receiver if the second output signal from the second receiver is found to be different from a stored normal value through comparison therewith. Therefore, in an arrangement having a plurality of transmission and reception units or a plurality of contactless range detection sensors, it is possible to detect the occurrence of failures of each of the transmission and reception units easily.

The failure judging section may calculate a cross-correlation value based on a drive signal supplied to the first transmitter and the second output signal from the second receiver, and may judge that a failure has occurred in the first transmitter or the second receiver if the calculated cross-correlation value does not fall within a range of the stored normal value. Thus, using the cross-correlation value, it is possible to make a relatively accurate failure judgment.

The failure judging section may limit a processing range for the cross-correlation value to a range which is set depending on a distance between the first transmitter and the second receiver. Therefore, the processing burden can be reduced.

The failure judging section may judge that a failure has occurred in the first transmission and reception unit or the second transmission and reception unit if the result of the comparison between the first output signal and the second output signal does not fall within a normal range. Therefore, in an arrangement having a plurality of transmission and reception units or a plurality of contactless range detection sensors, it is possible to detect failures in each of the transmission and reception units easily.

The failure judging section preferably calculates a first cross-correlation value based on a drive signal supplied to the second transmitter and the first output signal from the first receiver, calculates a second cross-correlation value based on a drive signal supplied to the first transmitter and the second output signal from the second receiver, and judges that a failure has occurred in the first transmission and reception unit or the second transmission and reception unit if the result of a comparison between the calculated first cross-correlation value and the calculated second cross-correlation value does not fall within the normal range. Thus, using the first cross-correlation value and the second cross-correlation value, it is possible to make a relatively accurate failure judgment.

The failure judging section preferably limits a processing range for the first cross-correlation value to a range which is set depending on a distance between the second transmitter and the first receiver, and limits a processing range for the second cross-correlation value to a range which is set depending on the distance between the first transmitter and the second receiver. Therefore, the processing burden can be reduced.

Preferably, each of the first transmission and reception unit and the second transmission and reception unit is an ultrasonic sensor. In this case, if the transmitter emits the transmission wave, which is used by the distance detector to detect the distance up to the object, the transmitter may emit the transmission wave at the same frequency as a resonant frequency of an oscillator of the ultrasonic sensor. Further, if the transmitter emits the transmission wave, which is used by the failure judging section to judge the occurrence of a failure, the transmitter may emit the transmission wave at a frequency lower than the resonant frequency. Therefore, adverse effects that reverberation may have on the failure judgment control process are reduced, so that the failure judging section can judge the occurrence of a failure with increased accuracy.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A. First Embodiment

1. Arrangement

[1-1. Overall Arrangement]

Figure 1:
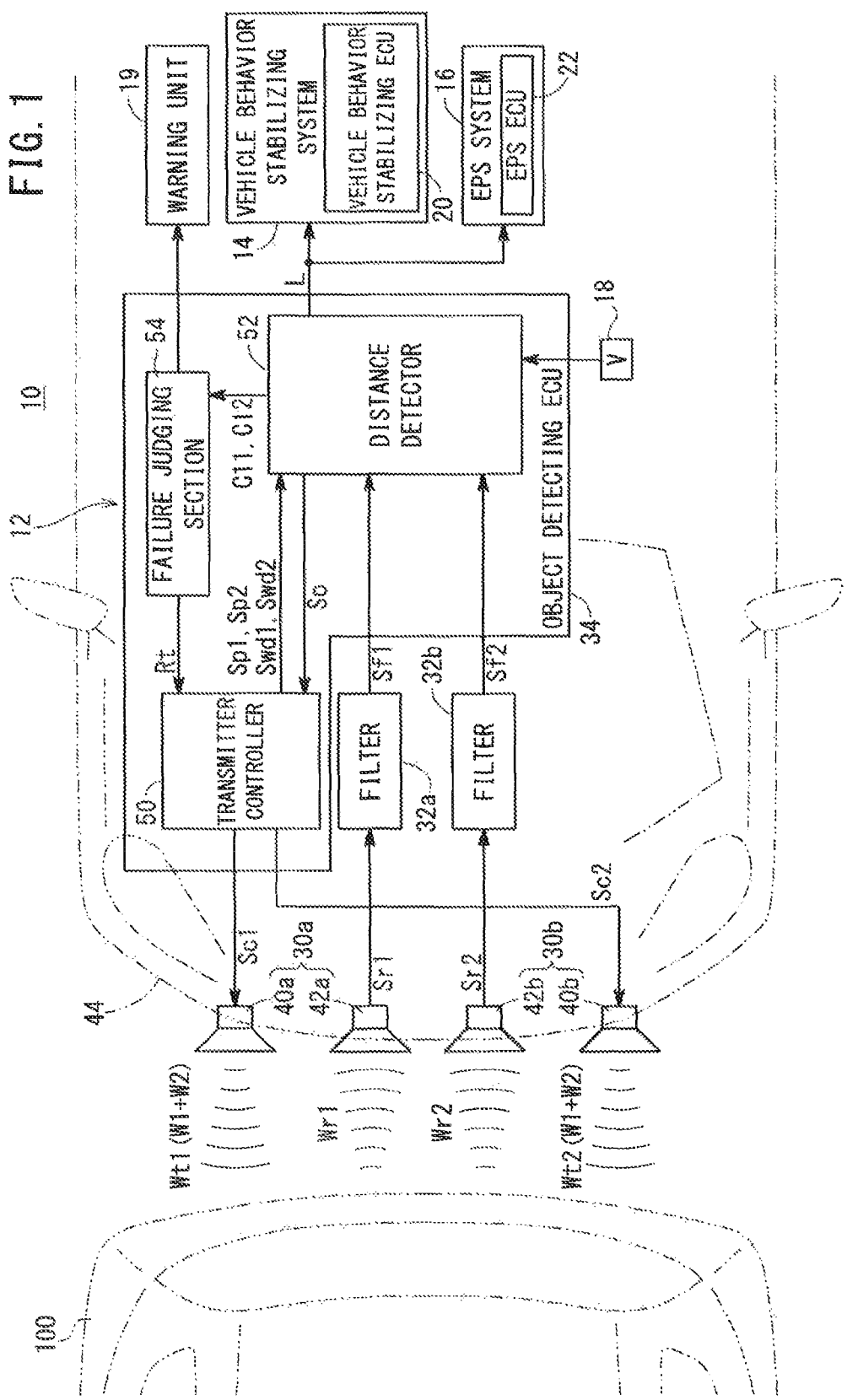
FIG. 1 is a block diagram of a vehicle incorporating an object detecting apparatus according to a first embodiment of the present invention.

FIG. 1 shows in block form a vehicle 10 in which an object detecting apparatus 12 according to a first embodiment of the present invention is incorporated. As shown in FIG. 1, the vehicle 10 includes, in addition to the object detecting apparatus 12, a vehicle behavior stabilizing system 14, an electric power steering system 16 (hereinafter referred to as an "EPS system 16"), a vehicle speed sensor 18, and a warning unit 19.

The object detecting apparatus 12 detects various objects, e.g., another vehicle, a human being, or a wall, appearing around the periphery of the vehicle 10. The object detecting apparatus 12 detects a distance L from the vehicle 10 up to an object 100 (hereinafter referred to as a "detected object 100") that is detected.

The vehicle behavior stabilizing system 14 includes an electronic control unit 20 (hereinafter referred to as a "vehicle behavior stabilizing ECU 20") for performing a vehicle behavior stabilizing control process, which serves to stabilize the behavior of the vehicle 10 when the vehicle 10 makes a turn along a curved path or the like, by controlling a non-illustrated brake system, etc.

The EPS system 16 includes an electronic control unit 22 (hereinafter referred to as an "EPS ECU 22") for performing a steering assistance control process to assist the driver in steering the vehicle 10 by controlling various components, such as an electric motor, a torque sensor, a steering angle sensor, etc., of the EPS system 16.

The vehicle speed sensor 18 detects a vehicle speed V [km/h] of the vehicle 10, and supplies the detected vehicle speed V to the object detecting apparatus 12. When the object detecting apparatus 12 suffers from a failure, the warning unit 19 issues a warning signal concerning the failure. The warning unit 19 may comprise a display unit or a speaker, for example.

[1-2. Object Detecting Apparatus 12]

As shown in FIG. 1, the object detecting apparatus 12 includes ultrasonic sensors 30a, 30b (transmission and reception units), filters 32a, 32b, and an object detecting electronic control unit 34 (hereinafter referred to as an "object detecting ECU 34" or an "ECU 34").

(1-2-1. Ultrasonic Sensors 30a, 30b)

The ultrasonic sensors 30a, 30b include respective transmitters 40a, 40b for emitting combined transmission waves Wt1, Wt2 (hereinafter referred to as "transmission waves Wt1, Wt2") as ultrasonic waves out of the vehicle 10, and respective receivers 42a, 42b for receiving reflection waves Wr1, Wr2, which are reflected from the detected object 100, e.g., another vehicle, when the transmission waves Wt1, Wt2 are applied to the detected object 100.

The transmitters 40a, 40b emit respective transmission waves Wt1, Wt2 based on respective control signals Sc1, Sc2 (drive signals) from the ECU 34. Each of the transmission waves Wt1, Wt2 comprises a combination of a first transmission wave W1 for a short range (short-distance range) and a second transmission wave W2 for a long range (long-distance range). As will be described in detail later, each of the transmission waves Wt1, Wt2 comprises a burst wave made up from a burst of pulse waves 60 (see FIG. 4). According to the present embodiment, the transmitters 40a, 40b emit the transmission waves Wt1, Wt2 in fixed directions. However, the transmitters 40a, 40b may emit the transmission waves Wt1, Wt2 in varying directions. For example, the transmission waves Wt1, Wt2 may be deflected in order to scan an area in front of the vehicle 10.

The receivers 42a, 42b generate voltages corresponding to the received reflection waves Wr1, Wr2 (received waves), and supply the generated voltages as output signals (hereinafter referred to as "reflection wave signals Sr1, Sr2") to the ECU 34.

The ultrasonic sensors 30a, 30b are mounted horizontally and symmetrically on a front side, e.g., a front bumper 44 and/or a front grill, of the vehicle 10. The ultrasonic sensors 30a, 30b may also be mounted on a rear side, e.g., a rear bumper and/or a rear grill, of the vehicle 10, or on lateral sides, e.g., alongside the front bumper 44, of the vehicle 10, rather than on the front side of the vehicle 10. Alternatively, additional ultrasonic sensors may be mounted on the rear side of the vehicle 10 or the lateral sides of the vehicle 10, in addition to the ultrasonic sensors 30a, 30b that are mounted on the front side of the vehicle 10.

In FIG. 1, the two ultrasonic sensors 30a, 30b are illustrated. However, three or more ultrasonic sensors 30a, 30b may be mounted on the vehicle 10.

In FIG. 1, the transmitter 40a and the receiver 42a are shown as being separate from each other. However, the transmitter 40a and the receiver 42a may have identical ultrasonic oscillators or a common ultrasonic oscillator. In addition, the transmitter 40b and the receiver 42b may have identical ultrasonic oscillators or a common ultrasonic oscillator. According to the present embodiment, the distance between the transmitter 40a and the receiver 42b are equal to each other, and the distance between the transmitter 40b and the receiver 42a are equal to each other. The transmitter 40a and the receiver 42a may have different ultrasonic oscillators. In addition, the transmitter 40b and the receiver 42b may have different ultrasonic oscillators.

As described later, instead of the ultrasonic sensors 30a, 30b, millimeter-wave radar sensors, laser radar sensors, or the like may be used.

(1-2-2. Filters 32a, 32b)

The filters 32a, 32b perform a distance detection filtering process on the output signals, i.e., the reflection wave signals Sr1, Sr2, from the receivers 42a, 42b, and supply the processed signals as filter signals Sf1, Sf2 to the ECU 34. The distance detection filtering process is a process, which is performed on the reflection wave signals Sr1, Sr2, in order to convert the reflection wave signals Sr1, Sr2 into signals suitable for the ECU 34, so as to enable the ECU 34 to calculate the distance L from the vehicle 10 to the detected object 100. More specifically, according to the present embodiment, the filters 32a, 32b perform a bandpass filtering process and an enveloping process (both of which will be described later).

Although the filter signals Sf1, Sf2 are analog signals, the filter signals Sf1, Sf2 are converted into digital signals by non-illustrated analog/digital converters in the ECU 34 before the filter signals Sf1, Sf2 are used in the ECU 34.

(1-2-3. Object Detecting ECU 34)

(1-2-3-1. Overall Arrangement of Object Detecting ECU 34)

The object detecting ECU 34 includes an input/output unit, a processor, and a memory, none of which are shown, as hardware components. The input/output unit includes the aforementioned analog/digital converters. The memory includes a RAM (Random Access Memory) and a ROM (Read Only Memory).

The ECU 34 has a transmitter controller 50, a distance detector 52, and a failure judging section 54, which serve as functional components thereof, i.e., functions performed by the processor.

(1-2-3-2. Transmitter Controller 50)

The transmitter controller 50 sends respective control signals Sc1, Sc2 to the transmitters 40a, 40b in order to control the outputs of the transmitters 40a, 40b. As will be described in detail later with reference to FIGS. 3 and 4, the transmitter controller 50 supplies the control signals Sc1, Sc2, each in the form of a pulse signal (burst signal), in predetermined periodic cycles.

(1-2-3-3. Distance Detector 52)

Based on the filter signals Sf1, Sf2, the distance detector 52 detects the distance L from the vehicle 10 up to the detected object 100. According to the present embodiment, the distance detector 52 calculates the distance L according to a cross-correlation process (to be described later).

(1-2-3-4. Failure Judging Section 54)

The failure judging section 54 judges whether or not a failure has occurred in the ultrasonic sensors 30a, 30b. According to the present embodiment, the failure judging section 54 judges such a failure according to a cross-correlation process (to be described later).

2. Normal Control Process

[2-1. Overall Processing of Object Detecting Apparatus 12 for Normal Control Process]

Figure 2:
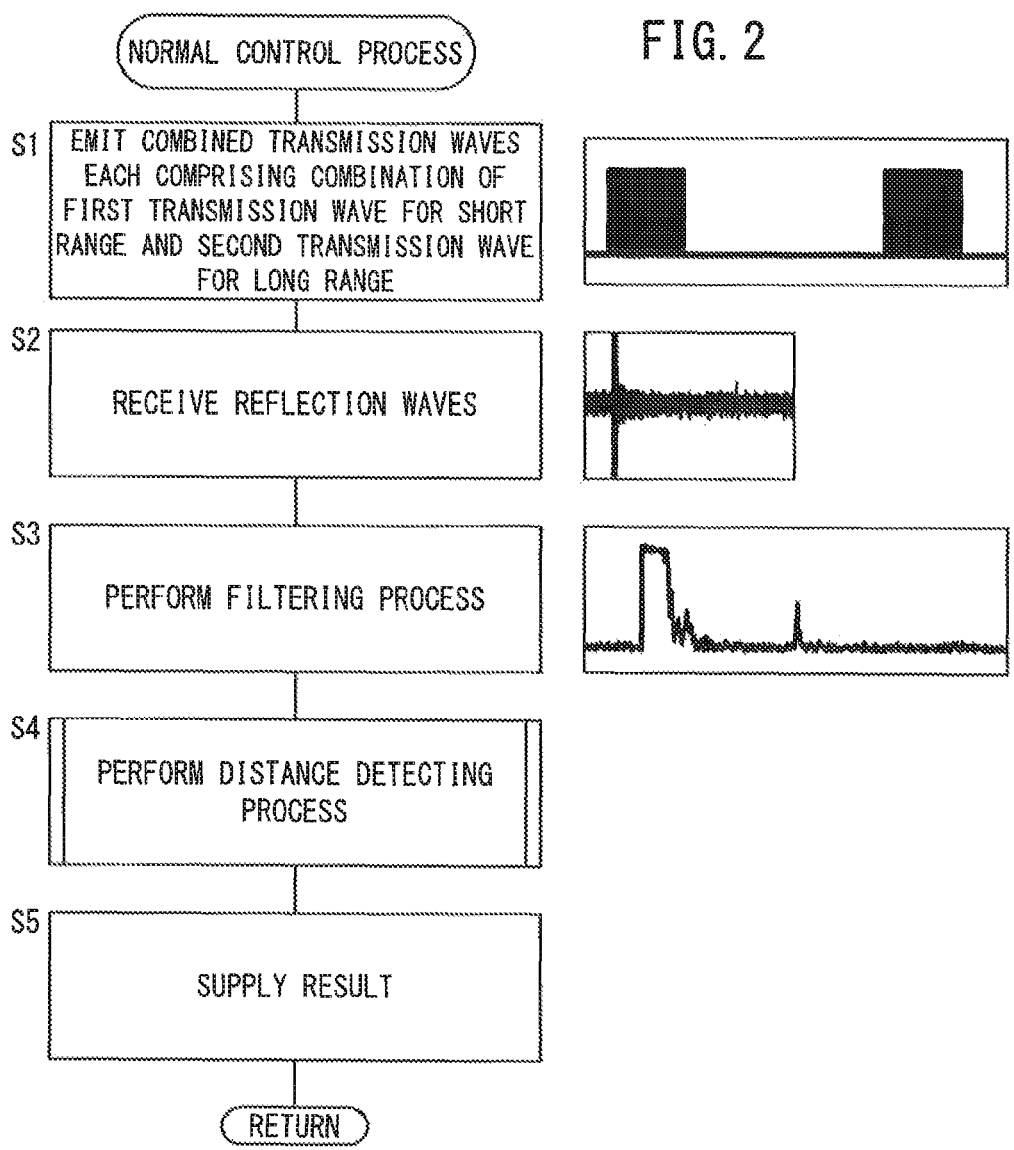
FIG. 2 is a flowchart of an overall normal control process performed by the object detecting apparatus, combined with a plurality of signals generated during the normal control process.

FIG. 2 is a flowchart of an overall normal control process performed by the object detecting apparatus 12, combined with a plurality of signals generated in the normal control process. In step S1 of FIG. 2, the transmitters 40a, 40b of the object detecting apparatus 12 successively emit combined transmission waves Wt1, Wt2. Each of the combined transmission waves Wt1, Wt2 comprises a combination made up of a first transmission wave W1 for a short range, and a second transmission wave W2 for a long range.

The emitted combined transmission waves Wt1, Wt2 are reflected by an object (a detected object 100, e.g., another vehicle), which appears in the detection areas of the ultrasonic sensors 30a, 30b, and are returned as reflection waves Wr1, Wr2 to the object detecting apparatus 12. As noted above, the detection areas include a short range and a long range. The short range covers an area from 0 m to 4 m, for example, and the long range covers an area from 4 m to 10 m, for example.

In step S2, the receivers 42a, 42b of the object detecting apparatus 12 receive the reflection waves Wr1, Wr2, respectively, and supply reflection wave signals Sr1, Sr2 corresponding to the reflection waves Wr1, Wr2 respectively to the filters 32a, 32b. As described later, the reflection wave signals Sr1, Sr2 may contain noise such as reverberation noise.

In step S3, the filters 32a, 32b perform a distance detection filtering process on the reflection wave signals Sr1, Sr2 in order to produce respective filter signals Sf1, Sf2.

In step S4, the distance detector 52 performs a distance detecting process based on the filter signals Sf1, Sf2. The distance detecting process is a process for detecting the distance L from the vehicle 10 up to the detected object 100. Details of the distance detecting process will be described later with reference to FIG. 10, etc.

In step S5, the object detecting apparatus 12 supplies the result of the distance detecting process (step S4), i.e., the distance L detected by the distance detector 52, to the vehicle behavior stabilizing system 14 and the EPS system 16. The vehicle behavior stabilizing system 14 and the EPS system 16 perform respective processes of their own using the supplied result.

According to the present embodiment, the distance detecting process uses a cross-correlation value C, as will be described later. As the vehicle speed V of the vehicle 10 becomes higher, the cross-correlation value C tends to become lower in accuracy, because the Doppler Effect due to the reflection waves Wr becomes more intensive.

Thus, according to the present embodiment, a vehicle speed threshold value THv is established for judging whether or not the normal control process shown in FIG. 2 should be carried out. If the vehicle speed V detected by the vehicle speed sensor 18 is less than the vehicle speed threshold value THv, the normal control process shown in FIG. 2 is performed. If the vehicle speed V detected by the vehicle speed sensor 18 is greater than the vehicle speed threshold value THv, the normal control process shown in FIG. 2 is canceled. The vehicle speed threshold value THv may be any value in a range from 5 to 30 km/h.

[2-2. Output of Transmission Waves Wt (Step S1 of FIG. 2)]
(2-2-1. Overview)

Figure 3:
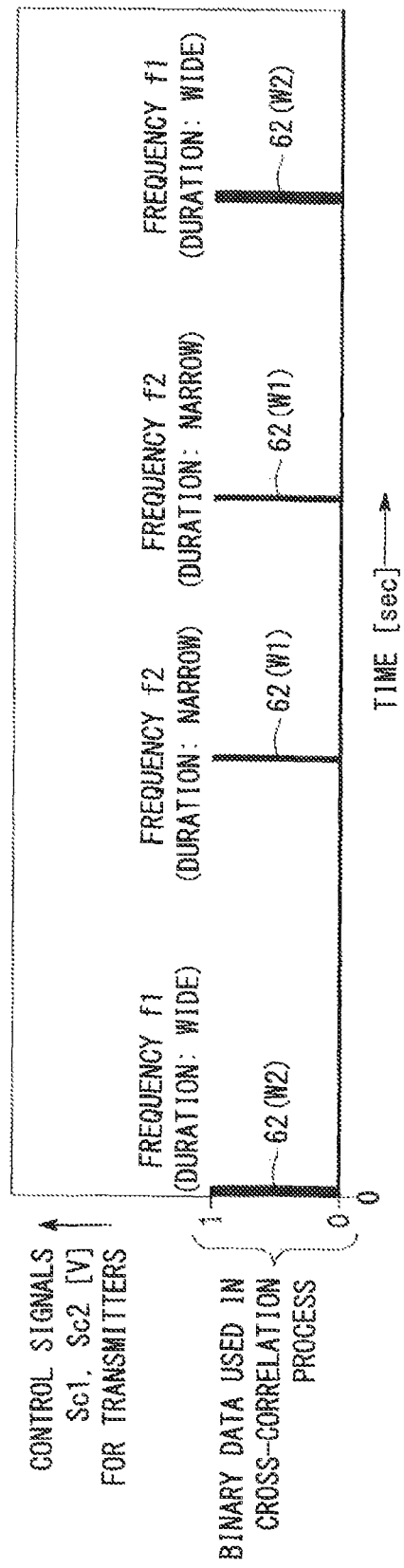
FIG. 3 is a diagram showing by way of example control signals supplied from an object detection electronic control unit to transmitters.
Figure 4:
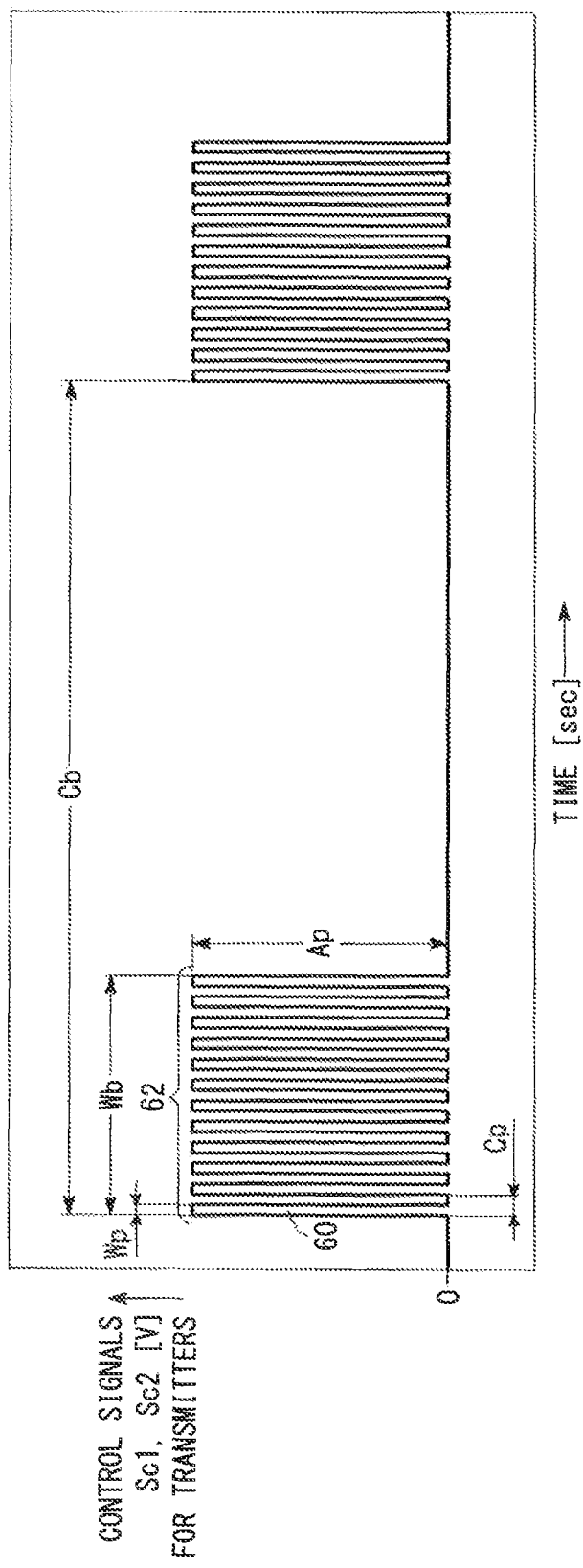
FIG. 4 is a diagram illustrating the control signals.

FIG. 3 is a diagram showing by way of example the control signals Sc1, Sc2 that are supplied from the object detecting ECU 34 to the transmitters 40a, 40b. FIG. 4 is another diagram illustrating the control signals Sc1, Sc2. As shown in FIG. 4, each of the control signals Sc1, Sc2 (drive signals) is generated as a pulse burst 62 (burst wave) comprising a succession of pulse waves 60 each having a duration Wp and an amplitude Ap. The period of each of the pulse waves 60 in the pulse burst 62 will be referred to as a "pulse wave period Cp", and the period of the pulse burst 62 will be referred to as a "pulse burst period Cb". If the number of the pulse waves 60 of the pulse burst 62 is represented by Np, then the duration of the pulse burst 62 (hereinafter referred to as a "duration Wb") is represented by the formula Cp×Np−(Cp−Wp).

At the time of supply of the control signals Sc1, Sc2 to the respective transmitters 40a, 40b, the oscillators, e.g., piezoelectric elements, of the transmitters 40a, 40b are oscillated depending on the pulse waves 60, so as to emit respective transmission waves Wt1, Wt2 as ultrasonic waves.

According to the present embodiment, the wavelengths of the transmission waves Wt1, Wt2 are changed for the long range and the short range. More specifically, the pulse wave period Cp of the pulse waves 60 for the long range is set to bring about a certain resonant frequency f1 for the oscillators of the transmitters 40a, 40b. The pulse wave period Cp of the pulse waves 60 for the short range is set to bring about a frequency f2, which is lower than the resonant frequency f1. Stated otherwise, the frequency (burst frequency) of the second transmission wave W2, which comprises a burst wave, is set to be equal to the resonant frequency f1, whereas the frequency (burst frequency) of the first transmission wave W1 is set to be equal to the frequency f2.

As shown in FIG. 3, the duration Wb of the pulse burst 62 is changed for the long range and the short range. More specifically, the duration Wb of the second transmission wave W2 for the long range is wider, i.e., the output time of the second transmission wave W2 for the long range is longer, whereas the duration Wb of the first transmission wave W1 for the short range is narrower, i.e., the output time of the second transmission wave W2 for the long range is shorter. Alternatively, the duration Wb may be the same for both the long range and the short range.

The pulse burst period Cb varies depending on whether or not the detected object 100 exists. More specifically, if the detected object 100 does not exist, the pulse burst period Cb of the first transmission wave W1 for the short range (hereinafter referred to as a "period Cw1") is longer, and the pulse burst period Cb of the second transmission wave W2 for the long range (hereinafter referred to as a "period Cw2") is shorter than if the detected object 100 does exist.

The duration Wp and the pulse wave period Cp of each of the pulse waves 60, and the duration Wb and the pulse burst period Cb of the pulse burst 62 are established by the transmitter controller 50 of the object detecting ECU 34.

The transmitter controller 50 supplies transmission wave pattern signals Sp1, Sp2, which are representative of respective patterns Pw1, Pw2 of the first and second transmission waves W1, W2, to the distance detector 52. The transmission wave pattern signals Sp1, Sp2 are used during the distance detecting process (cross-correlation process) which is carried out by the distance detector 52. According to the present embodiment, each of the patterns Pw1, Pw2 of the first and second transmission waves W1, W2 is represented by binary data indicative of the duration Wb and the pulse burst period Cb of the pulse burst 62, or stated otherwise, is represented by a pattern indicative of the envelope of a control signal Sc. Alternatively, each of the patterns Pw1, Pw2 of the first and second transmission waves W1, W2 may be the same as a pattern that is indicative of the control signal Sc.

(2-2-2. Duration Wp and Pulse Wave Period Cp of Pulse Waves 60)

Figure 5:
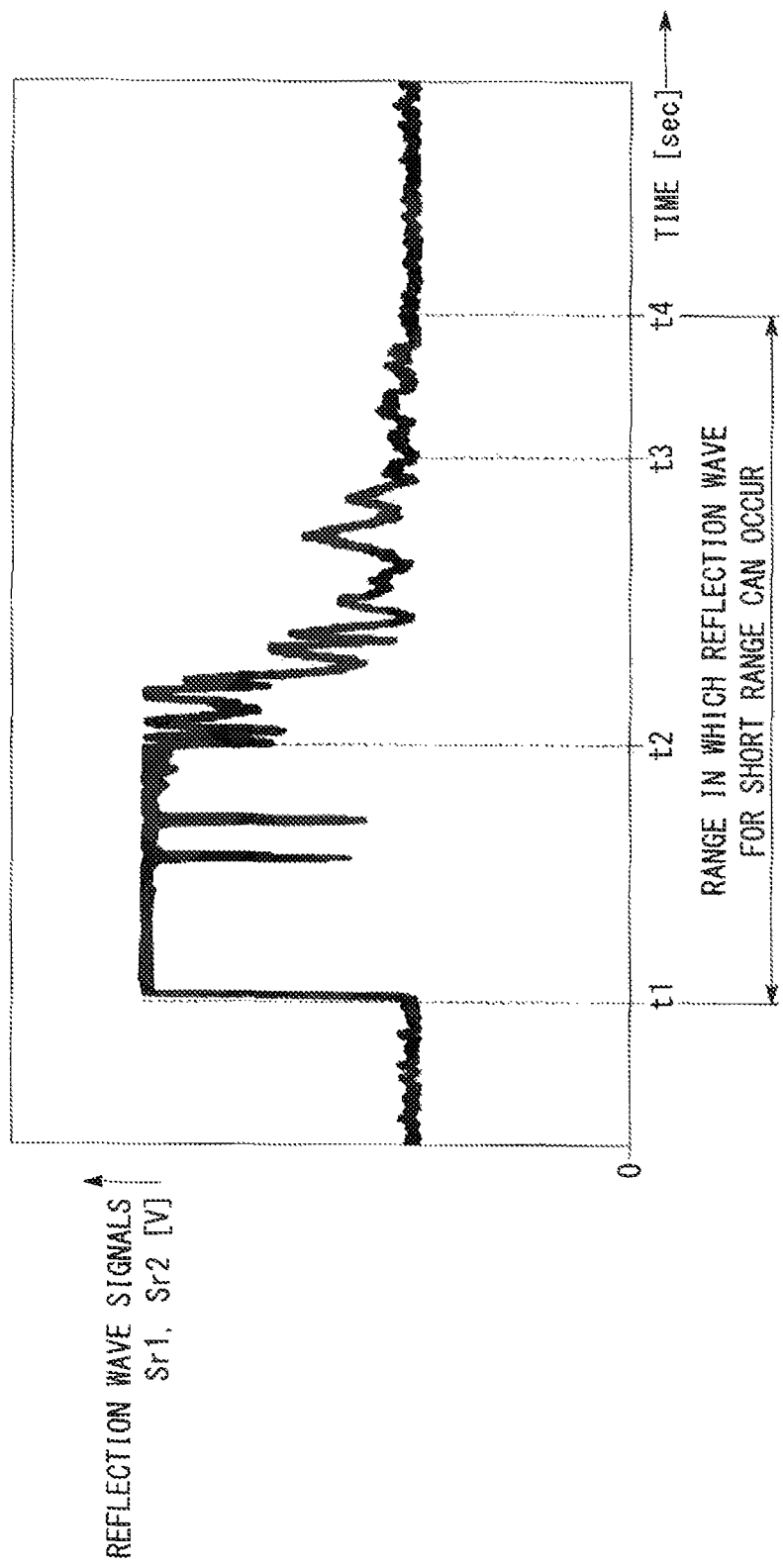
FIG. 5 is a diagram illustrating problems to be dealt with when a first transmission wave and a second transmission wave are combined with each other.

FIG. 5 is a diagram illustrating a problem that must be dealt with when the first transmission wave W1 and the second transmission wave W2 are combined. As shown in FIG. 5, the transmitter 40*a* or the transmitter 40*b* emits a transmission wave in which the duration Wb of the pulse burst 62 is relatively wide, e.g., the second transmission wave W2, from time t1 to time t2, and in which reverberation occurs from time t2 to time t3. Further, it is possible for a reflection wave Wr from the short range to occur in an interval from time t1 to time t4. As shown in FIG. 5, about one-half of the interval in which the reflection wave Wr from the short range can occur is affected by the second transmission wave W2. Therefore, in this case, the distance L in the short range cannot be detected accurately.

According to the present embodiment, the pulse wave period Cp of each of the pulse waves 60 is set in view of the output characteristics of the ultrasonic sensors 30*a*, 30*b*.

Figure 6:
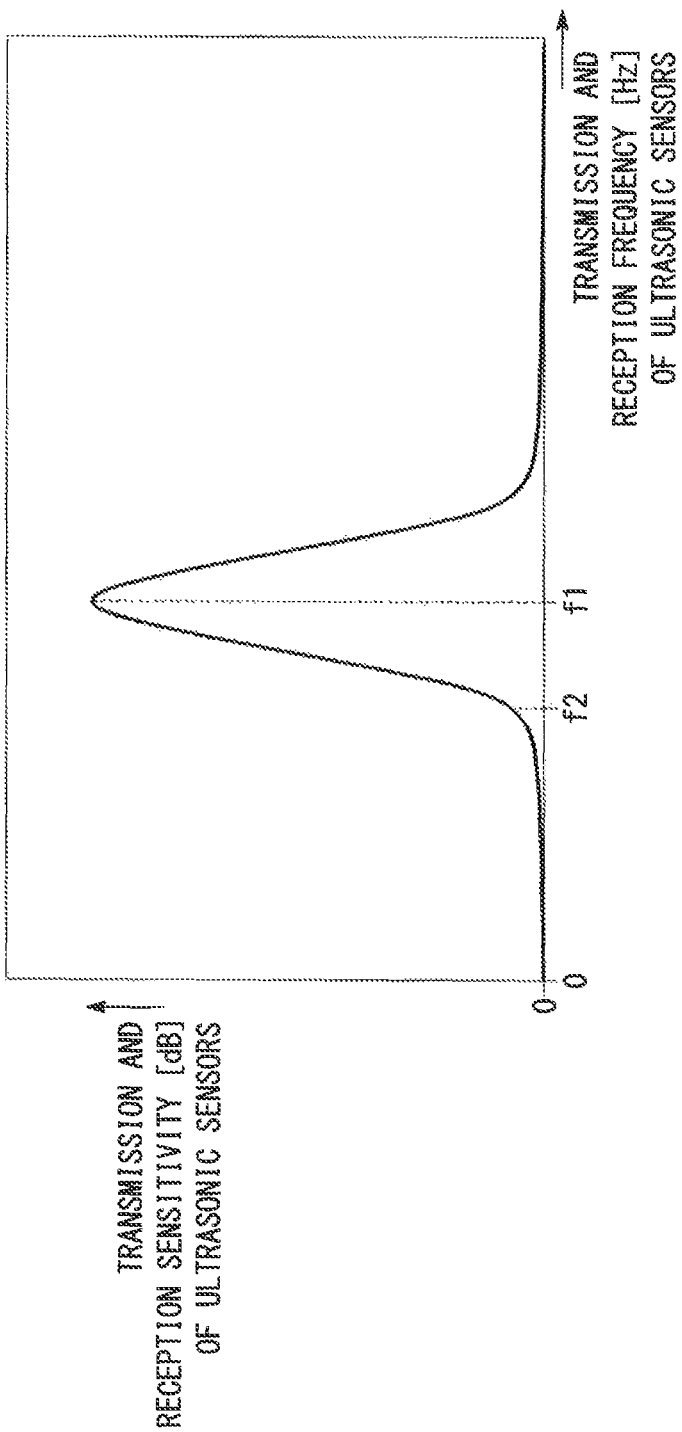
FIG. 6 is a diagram showing by way of example a relationship between the transmission frequency (pulse wave period) and the reception frequency of an ultrasonic sensor, and the transmission sensitivity and the reception sensitivity of the ultrasonic sensor.

FIG. 6 is a diagram showing, by way of example, a relationship between the transmission frequency (pulse wave period Cp) and the reception frequency of the ultrasonic sensors 30*a*, 30*b*, and the transmission sensitivity and the reception sensitivity of the ultrasonic sensors 30*a*, 30*b*. As shown in FIG. 6, the transmission sensitivity and the reception sensitivity of the ultrasonic sensors 30*a*, 30*b* are highest when the transmission frequency and the reception frequency of the ultrasonic sensors 30*a*, 30*b* are set at the resonant frequency f1. As the transmission frequency and the reception frequency of the ultrasonic sensors 30*a*, 30*b* are located farther away from the resonant frequency f1, the transmission sensitivity and the reception sensitivity of the ultrasonic sensors 30*a*, 30*b* become lower.

According to the present embodiment, the pulse wave period Cp of each of the pulse waves 60 for the long range is set so as to realize the resonant frequency f1 for the oscillators of the transmitters 40*a*, 40*b*, and so that the output level (amplitude) of the second transmission wave W2 increases relatively in order to allow the reflection wave Wr from the long range to be used for detecting the distance L.

The pulse wave period Cp of each of the pulse waves 60 for the short range is set so as to realize the frequency f2, which is lower than the resonant frequency f1, and so that the output level (amplitude) of the first transmission wave W1 decreases relatively in order to allow the reflection wave Wr from the short range to be used for detecting the distance L.

In addition, according to the present embodiment, the duration Wp of each of the pulse waves 60 for the long range is set to be wider than the duration Wp of each of the pulse waves 60 for the short range.

(2-2-3. Setting of Pulse Burst Period Cb)

Figure 7:
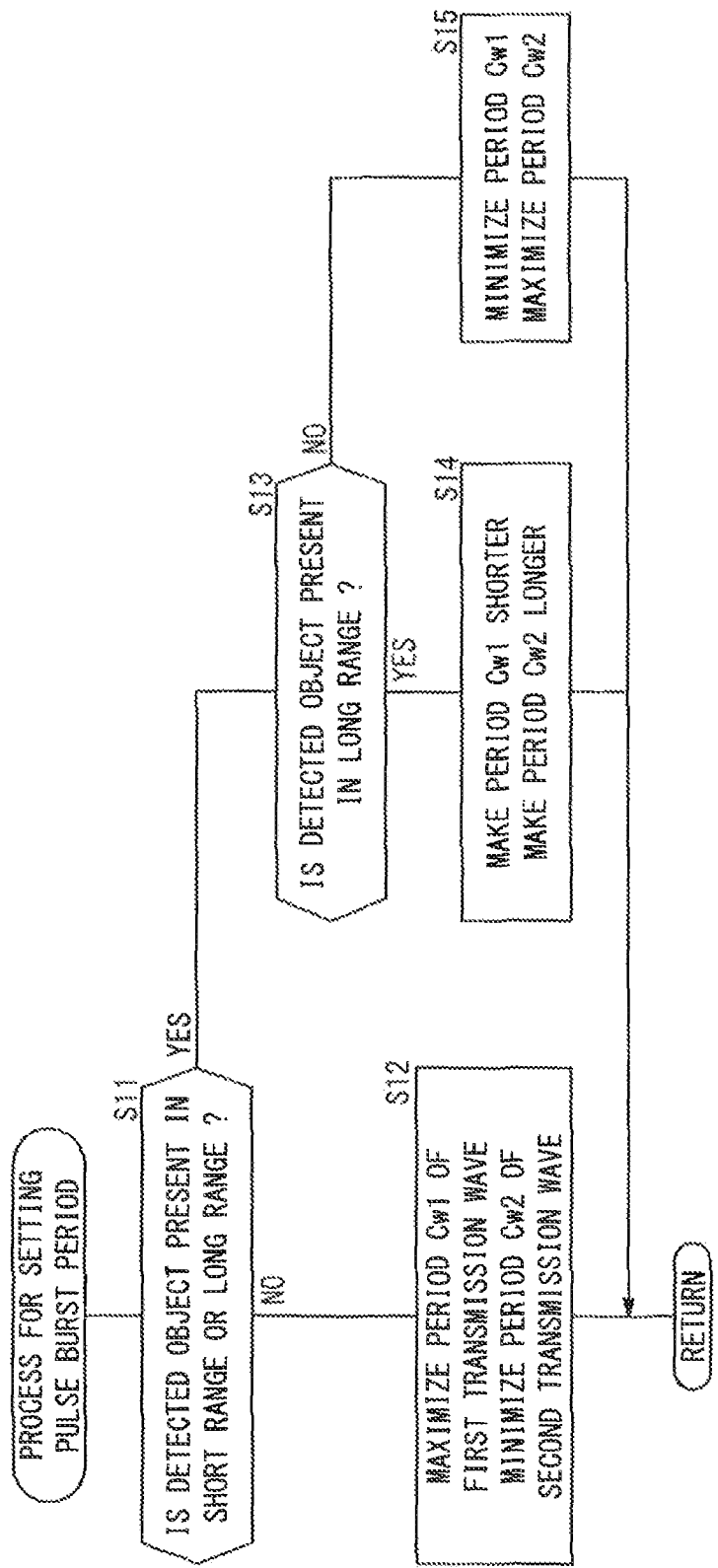
FIG. 7 is a flowchart of a process for setting a pulse burst period.

FIG. 7 is a flowchart of a process for setting the pulse burst period Cb. In step S11 of FIG. 7, the transmitter controller 50 judges whether or not the detected object 100 exists within the short range or the long range, based on a signal (i.e., an object presence/absence signal So) from the distance detector 52.

If the detected object 100 does not exist within the short range or the long range (step S11: NO), then in step S12, the transmitter controller 50 minimizes the pulse burst period Cb (period Cw2) of the second transmission wave W2 for the long range, and maximizes the pulse burst period Cb (period Cw1) of the first transmission wave W1 for the short range. Stated otherwise, the number of the pulse waves of the second transmission wave W2 is maximized, whereas the number of the pulse waves of the first transmission wave W1 is minimized.

If the detected object 100 exists within the short range or the long range (step S11: YES), then in step S13, the transmitter controller 50 judges whether or not the detected object 100 exists within the long range.

If the detected object 100 exists within the long range (step S13: YES), then in step S14, the transmitter controller 50 makes the period Cw2 longer and makes the period Cw1 shorter than the corresponding periods Cw1, Cw2 in step S12. Stated otherwise, in step S14, the number of the pulse waves of the second transmission wave W2 is made less than the corresponding number in step S12, whereas the number of the pulse waves of the first transmission wave W1 is made greater than the corresponding number in step S12.

If the detected object 100 does not exist within the long range (step S13: NO), then the detected object 100 is determined to exist within the short range. In this case, in step S15, the transmitter controller 50 maximizes the period Cw2 and minimizes the period Cw1. Stated otherwise, the number of the pulse waves of the second transmission wave W2 is minimized, whereas the number of the pulse waves of the first transmission wave W1 is maximized. Maximizing the period Cw2 may include the feature of stopping the output of the second transmission wave W2.

[2-3. Reception of Reflection Waves Wr1, Wr2 (Step S2 of FIG. 2)]

Figure 8:
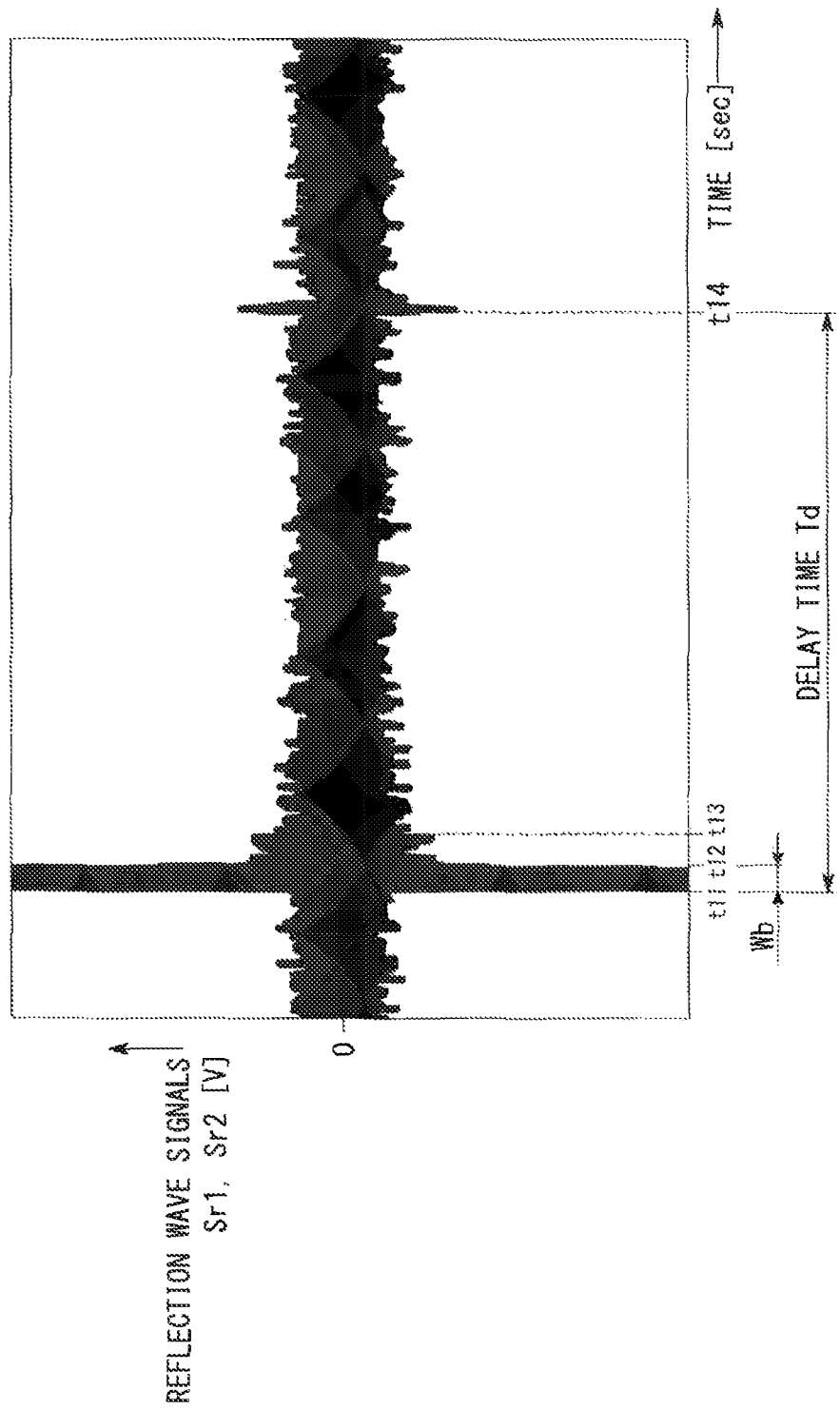
FIG. 8 is a diagram showing by way of example a reflection signal that is produced as an output signal from a receiver.

FIG. 8 is a diagram showing by way of example reflection signals Sr1, Sr2, which are produced as output signals from the receivers 42*a*, 42*b*. According to the present embodiment, as described above, the transmitters 40*a*, 40*b* and the receivers 42*a*, 42*b* have identical ultrasonic oscillators, or share a common ultrasonic oscillator. Therefore, when the transmitter 40*a* emits the transmission wave Wt1, the oscillator of the receiver 42*a* detects the oscillation of the oscillator of the transmitter 40*a*. Consequently, the output signal (reflection wave signal Sr1) of the receiver 42*a* reflects the oscillation of the oscillator of the transmitter 40*a* as the transmitter 40*a* emits the transmission wave Wt1. The output signal (reflection wave signal Sr2) of the receiver 42*b* also reflects the oscillation of the oscillator of the transmitter 40*b* as the transmitter 40*b* emits the transmission wave Wt2.

Since according to the present embodiment the object detecting apparatus 12 includes the plural ultrasonic sensors 30*a*, 30*b*, the transmission wave Wt1, which is emitted from the transmitter 40*a* of the ultrasonic sensor 30*a* (first ultrasonic sensor), is received by the receiver 42*b* of the ultrasonic sensor 30*b* (second ultrasonic sensor). Similarly, the transmission wave Wt2, which is emitted from the transmitter 40*b* of the ultrasonic sensor 30*b*, is received by the receiver 42*a* of the ultrasonic sensor 30*a*.

As shown in FIG. 8, for example, the oscillator of the transmitter 40*a* starts emitting the transmission wave Wt1 (ultrasonic wave) at time t11, and continues to emit the transmission wave Wt1 until time t12. Even if the oscillator of the transmitter 40*a* ceases emission of the transmission wave Wt1 at time t12, the reflection wave signal Sr1 is not sufficiently lowered in level during a certain period including time t13. This is caused by a phenomenon referred to as "reverberation", in which the oscillator of the transmitter 40*a* continues mechanically oscillating, even after the control signal Sc1 as an electric signal has stopped being supplied to the transmitter 40*a*. The time during which reverberation continues, i.e., the reverberation time, varies depending on the magnitude of the emitted transmission wave Wt1 (the first transmission wave W1 and the second transmission wave W2). Hence, depending on how the control signal Sc1 is set, it is possible to estimate or set the reverberation time.

An increase in the reflection wave signal Sr1 at time t14, as shown in FIG. 8, is caused by the actual reflection wave Wr1. Consequently, the distance L from the vehicle 10 to the detected object 100 can be calculated by detecting a time (hereinafter referred to as a "delay time Td") from the time (time t11) at which emission of the transmission wave Wt1 is started to the time (time t14) at which the reflection wave Wr1 is received.

More specifically, assuming that the speed of ultrasonic waves, which are propagated through the air, i.e., the sonic speed c, is constant, then the distance L can be calculated according to the following equation (1).

$$\text{Distance } L = c \times \text{delay time } Td/2 \quad (1)$$

The sonic speed c may be corrected depending on the outside air temperature, which may be detected by a non-illustrated temperature sensor.

[2-4. Filtering Process (Step S3 of FIG. 2)]
(2-4-1. Overview of Filtering Process)

The filtering process comprises a signal processing routine for detecting a distance. The signal processing routine is carried out on the reflection wave signals Sr1, Sr2 by the filters 32a, 32b. According to the present embodiment, as the filtering process, the filters 32a, 32b perform a bandpass filtering process and an enveloping process.

(2-4-2. Bandpass Filtering Process)

The bandpass filtering process (hereinafter referred to as a "BPF process") is a filtering process for passing only the frequency of the transmission waves Wt1, Wt2 (hereinafter referred to as a "transmission wave frequency ft") out of the reflection waves Sr1, Sr2 and values in the vicinity thereof. A signal produced from the bandpass filtering process, which is performed by each of the filters 32a, 32b, is referred to as a "bandpass filter signal Sbpf" or a "BPF signal Sbpf".

According to the present embodiment, as described above, the transmission wave frequency ft is switched between the resonant frequency f1 and the frequency f2, which is lower than the resonant frequency f1. The above-noted values in the vicinity thereof preferably include values that are both greater and smaller than the transmission wave frequency ft. Alternatively, the values in the vicinity thereof may be either one of values that are greater than the transmission wave frequency ft and values that are smaller than the transmission wave frequency ft. Further, alternatively, according to the BPF process, the filters 32a, 32b may pass only the transmission wave frequency ft.

According to the present embodiment, as described above, when the vehicle 10 travels at a relatively low speed, the normal control process shown in FIG. 2 is carried out. On the other hand, when the vehicle 10 travels at a relatively high speed, the normal control process shown in FIG. 2 is canceled. Consequently, even if the passband according to the BPF process is set to the transmission wave frequency ft and values in the vicinity thereof, the passband can still be used adequately for detecting the distance L.

The above-described BPF process is effective to remove noise that is contained within the reflection wave signal Sr, at frequencies other than the transmission wave frequency ft and values in the neighborhood thereof, for thereby increasing the accuracy of the detected distance.

(2-4-3. Enveloping Process)

The enveloping process is a filtering process for generating an envelope based on the BPF signal Sbpf. A signal produced from the enveloping process, which is performed by each of the filters 32a, 32b, serves as an output signal (filter signals Sf1, Sf2) from the filters 32a, 32b.

Figure 9:
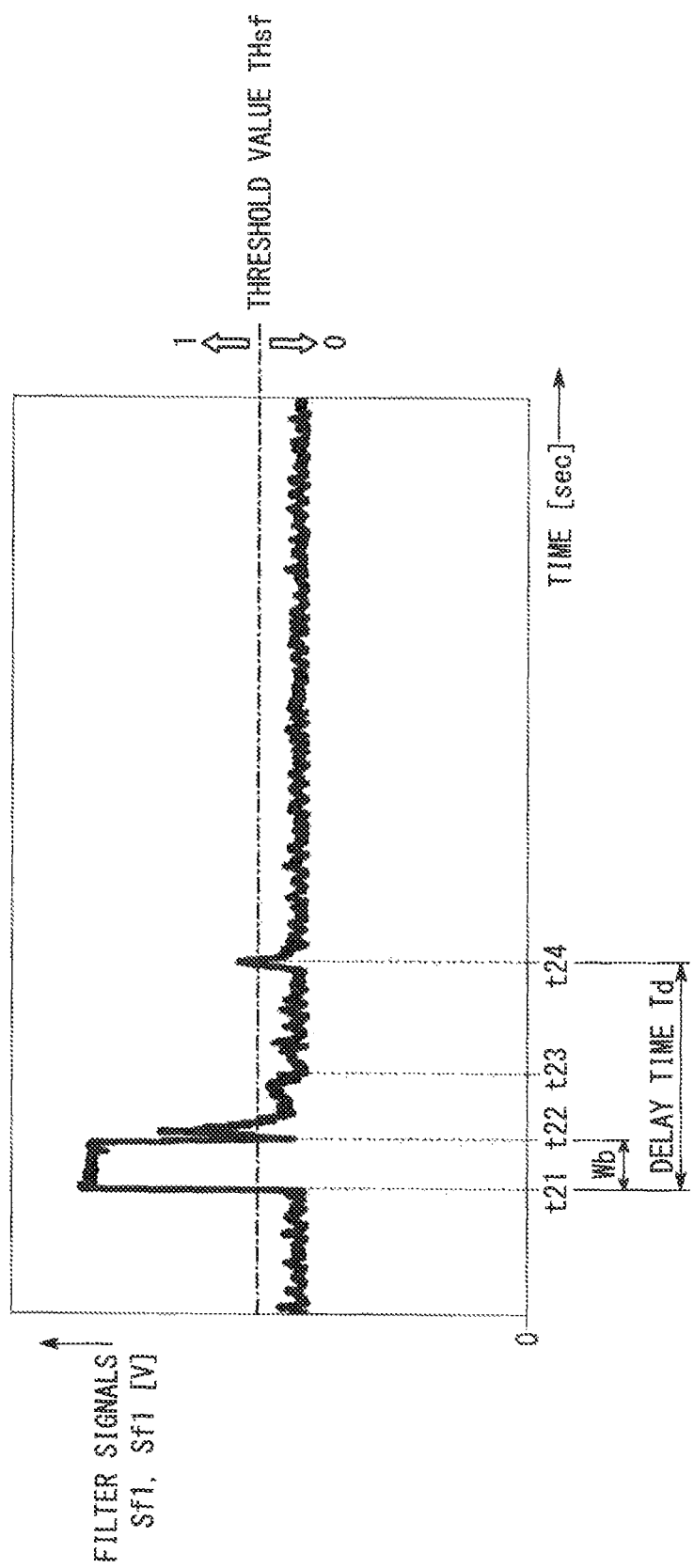
FIG. 9 is a diagram showing by way of example a filter signal that is produced as an output signal from a filter.

FIG. 9 is a diagram showing by way of example each of filter signals Sf1, Sf2, which are produced as output signals from the filters 32a, 32b. Similar to the case described above with respect to the reflection wave signal Sr1 shown in FIG. 8, time t21 shown in FIG. 9 corresponds to a time at which the oscillator of the transmitter 40a starts to emit the transmission wave Wt1. Emission of the transmission wave Wt1 continues until time t22. Reverberation exists between time t22 and time t23. Time t24 corresponds to a time at which the reflection wave Wr1 is received.

Accordingly, a period of time from time t21 to time t24 serves as a delay time Td. The distance L from the vehicle 10 up to the detected object 100 can be calculated based on the delay time Td (according to the present embodiment, the cross-correlation value C is used).

[2-5. Distance Detecting Process (Step S4 of FIG. 2)]

Figure 10:
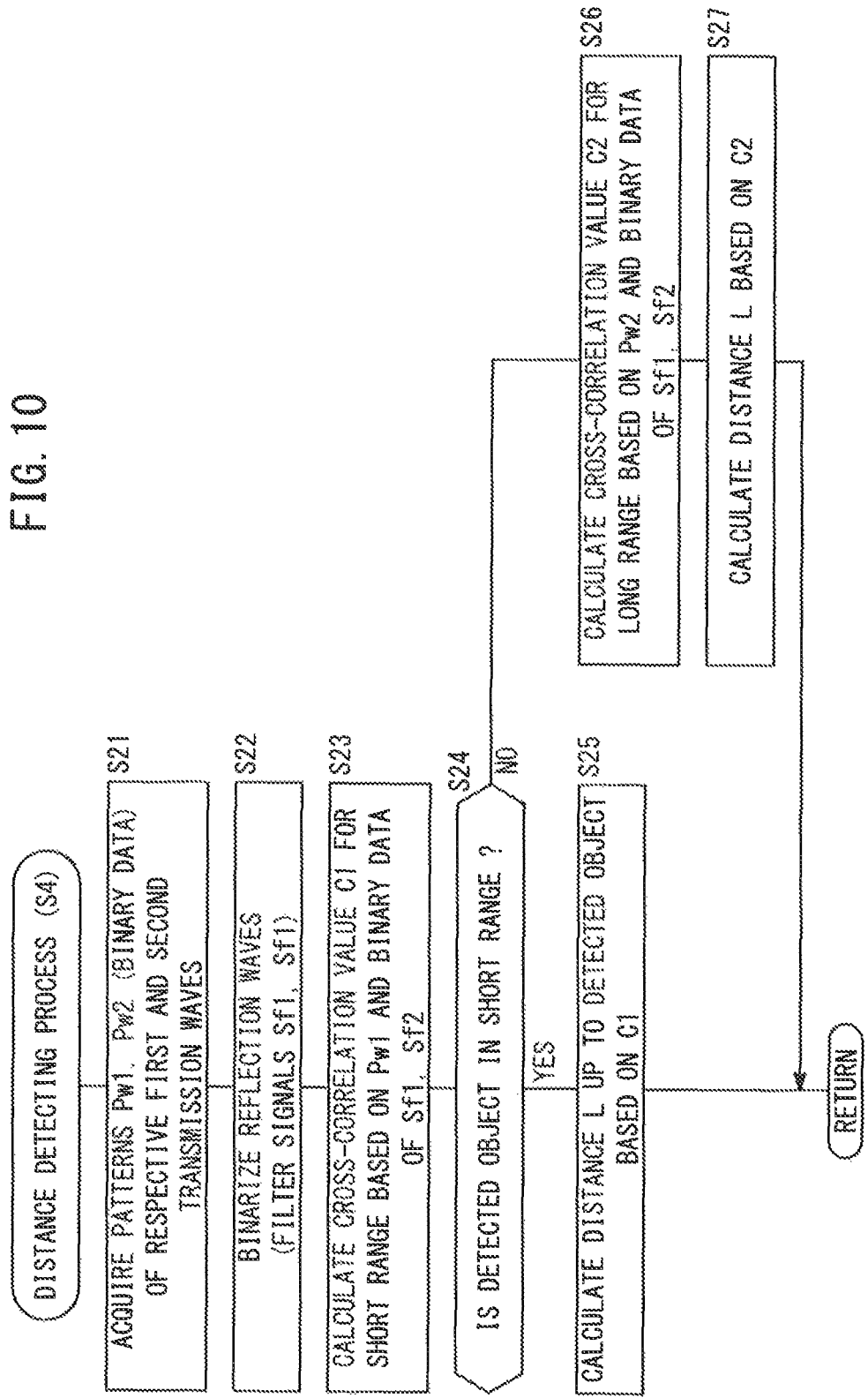
FIG. 10 is a flowchart of a distance detecting process (details of step S4 of FIG. 2)

FIG. 10 is a flowchart of the distance detecting process (details of step S4 of FIG. 2). The distance detecting process is carried out with respect to each of the ultrasonic sensors 30a, 30b. In step S21 of FIG. 10, the distance detector 52 acquires respective patterns Pw1, Pw2 (transmission wave pattern signals Sp1, Sp2) of the first and second transmission waves W1, W2 from the transmitter controller 50. According to the present embodiment, each of the patterns Pw1, Pw2 of the first and second transmission waves W1, W2 is represented by binary data that indicate the duration Wb and the pulse burst period Cb of the pulse burst 62. For example, the period (duration Wb) during which the pulse burst 62 (burst wave) is emitted is represented by "1", and the period during which the pulse burst 62 is not emitted is represented by "0".

In step S22, the distance detector 52 binarizes the filter signals Sf1, Sf2, which represent the reflection waves Wr1, Wr2, depending on the values (amplitudes) thereof. More specifically, as shown in FIG. 9, a threshold value THsf is established with respect to the values (amplitudes) of the filter signals Sf1, Sf2. If the values of the filter signals Sf1, Sf2 are greater than the threshold value THsf, the distance detector 52 sets the filter signals Sf1, Sf2 to "1". On the other hand, if the values of the filter signals Sf1, Sf2 are less than the threshold value THsf, the distance detector 52 sets the filter signals Sf1, Sf2 to "0". It is assumed that the threshold value THsf is a fixed value. However, as disclosed in paragraph [0016] and shown in FIG. 4 of JP 2009-222445 A, the threshold value THsf may be a variable value.

In step S23, the distance detector 52 calculates a cross-correlation value C for the short range (hereinafter referred to as a "cross-correlation value C1") based on the pattern Pw1 (binary data) of the first transmission wave W1 and the binary data of the reflection waves Wr1, Wr2 (filter signals Sf1, Sf2). The respective cross-correlation values C for the short range and the long range are calculated according to the following equation (2).

$$C(l) = \frac{\sum_{k=0}^{Nd-1} T(k) \cdot R(k+l)}{\sum_{k=0}^{Nd-1} T(k)} \quad (2)$$

In equation (2), T(k) represents the value of the binary data of the transmission waves Wt1, Wt2. More specifically, for comparison with the first transmission wave W1 in step S23, T(k) represents the pattern Pw1 as binary data, and for comparison with the second transmission wave W2 in step S26, T(k) represents the pattern Pw2 as binary data. Further, in equation (2), R(k+1) represents the value of the binary data of the reflection wave Wr (filter signal Sf), and l represents a shift number (which is indicative of the delay time Td) of the reflection wave signals Sr1, Sr2 (filter signals Sf1, Sf2) from the time at which the first transmission wave W1 or the second transmission wave W2 starts to be emitted. Alternatively, l may represent the distance L from the vehicle 10 up to the detected object 100. Moreover, in equation (2), Nd represents the sample number of the cross-correlation value C during one processing period.

Further details concerning calculation of the cross-correlation value C can be found with reference to JP 2009-222445 A, for example.

In step S24 of FIG. 10, the distance detector 52 judges whether or not the detected object 100 exists within the short range. More specifically, the distance detector 52 judges that the detected object 100 exists within the short range if the binary data of the filter signals Sf1, Sf2 continue to take "1" for a predetermined period Tx (FIG. 11) or longer from the time at which the second transmission wave W2 starts to be emitted, for example.

Figure 11:
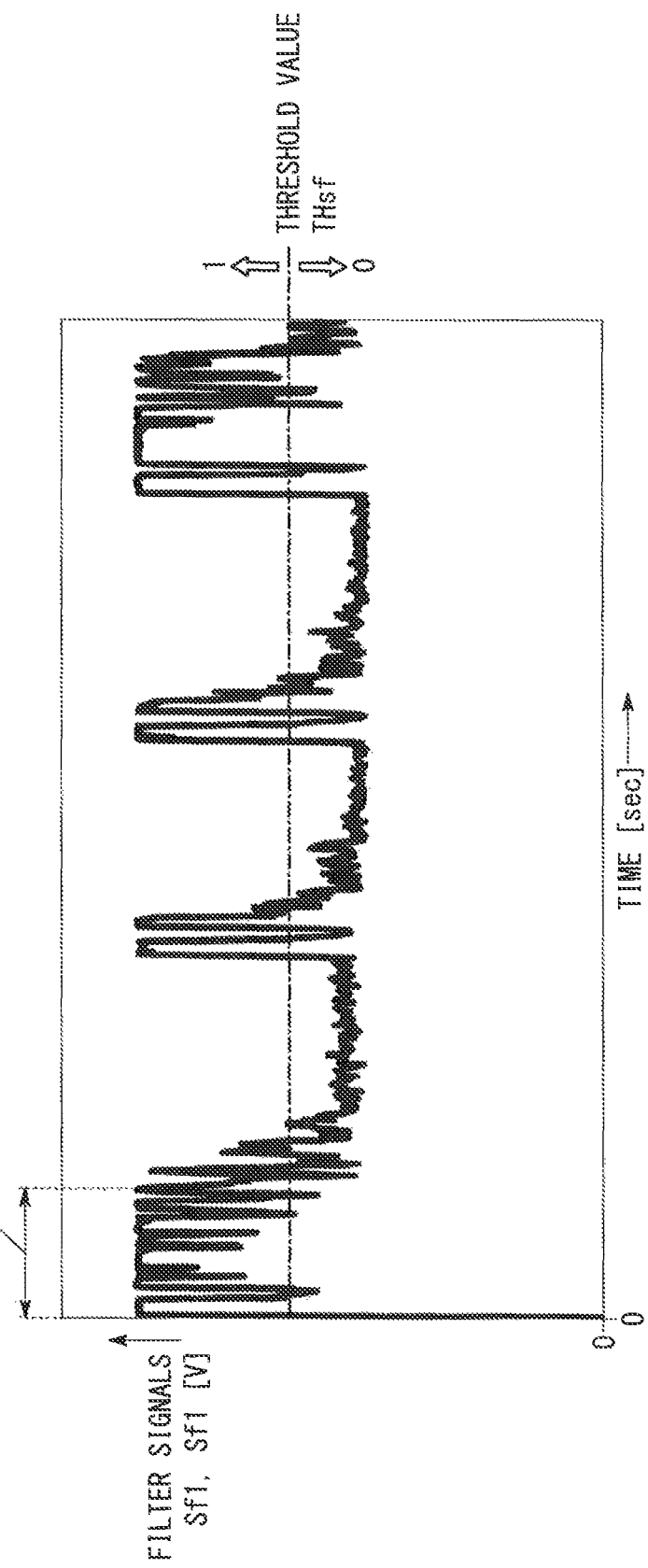
FIG. 11 is a diagram showing by way of example a filter signal that is produced when a detected object exists within a short range.
Figure 12:
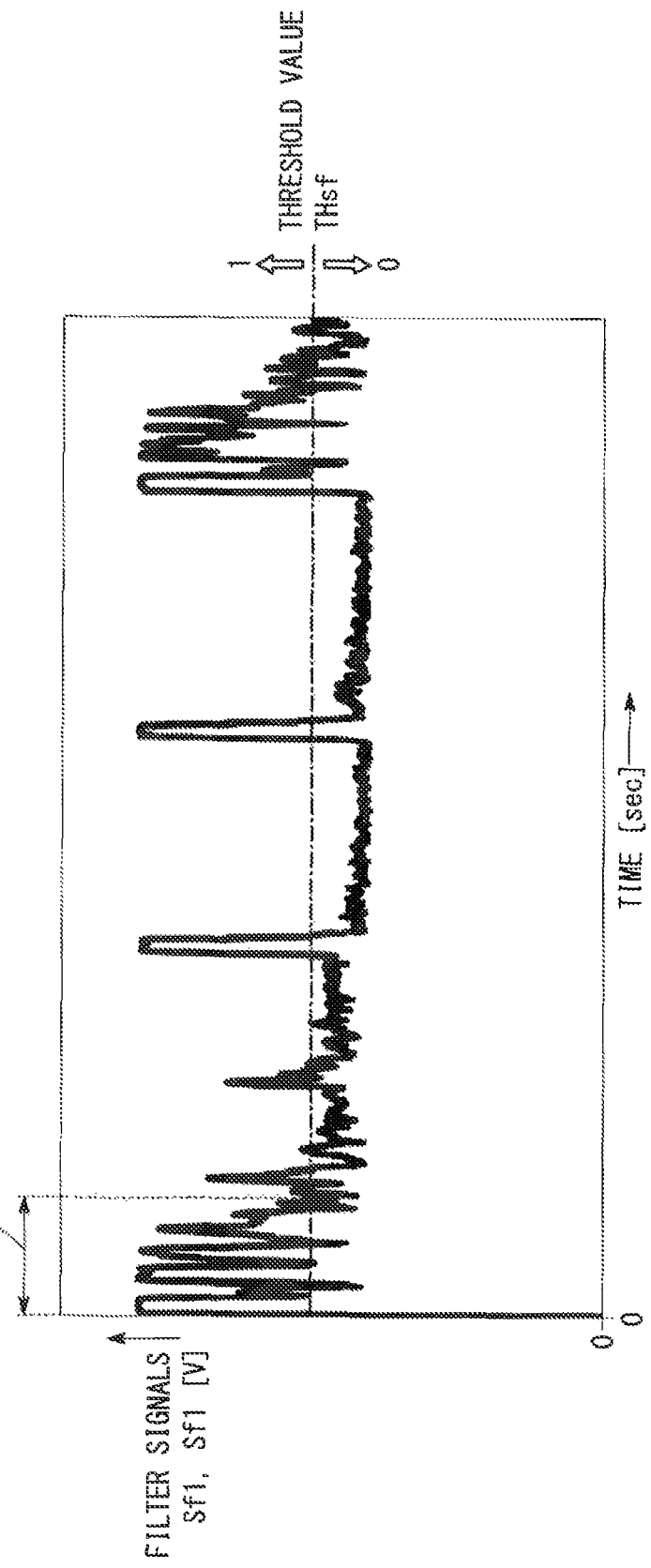
FIG. 12 is a diagram showing by way of example a filter signal that is produced when a detected object exists within a long range.

FIG. 11 is a diagram showing by way of example the filter signals Sf1, Sf2, which are produced when the detected object 100 exists within the short range. FIG. 12 is a diagram showing by way of example the filter signals Sf1, Sf2, which are produced when the detected object 100 exists within the long range. As shown in FIG. 11, if the detected object 100 exists within the short range, the binary data of the filter signals Sf1, Sf2 continue at a value of "1" for the predetermined period Tx or longer from the time at which the second transmission wave W2 starts to be emitted. On the other hand, as shown in FIG. 12, if the detected object 100 exists within the long range, the binary data of the filter signals Sf1, Sf2 do not continue at the value of "1" for the predetermined period Tx or longer from the time at which the second transmission wave W2 starts to be emitted. Therefore, by making a judgment concerning the period during which the binary data of the filter signals Sf1, Sf2 continue, the distance detector 52 is capable of determining whether or not the detected object 100 exists within the short range.

If the distance detector 52 judges that the detected object 100 exists within the short range (step S24: YES), then in step S25, the distance detector 52 calculates the distance L up to the detected object 100, based on the cross-correlation value C1 for the short range that was calculated in step S23. For example, if l in equation (2) is set as representing the delay time Td, then the distance detector 52 identifies the shift number l for maximizing the cross-correlation value C1 (hereinafter referred to as a "shift number lmax") and replaces the shift number lmax with the delay time Td.

Further, for replacing the shift number lmax with the delay time Td, the distance detector 52 presets a time corresponding to one shift. The distance detector 52 then substitutes the delay time Td, which is determined in equation (1), to calculate the distance L.

If the variable on the right side of equation (1) is the delay time Td only, then the distance L is uniquely determined by the time at which the shift number lmax is identified. Thus, rather than presetting a time corresponding to one shift, the distance detector 52 may preset a distance L corresponding to one shift.

Figure 13:
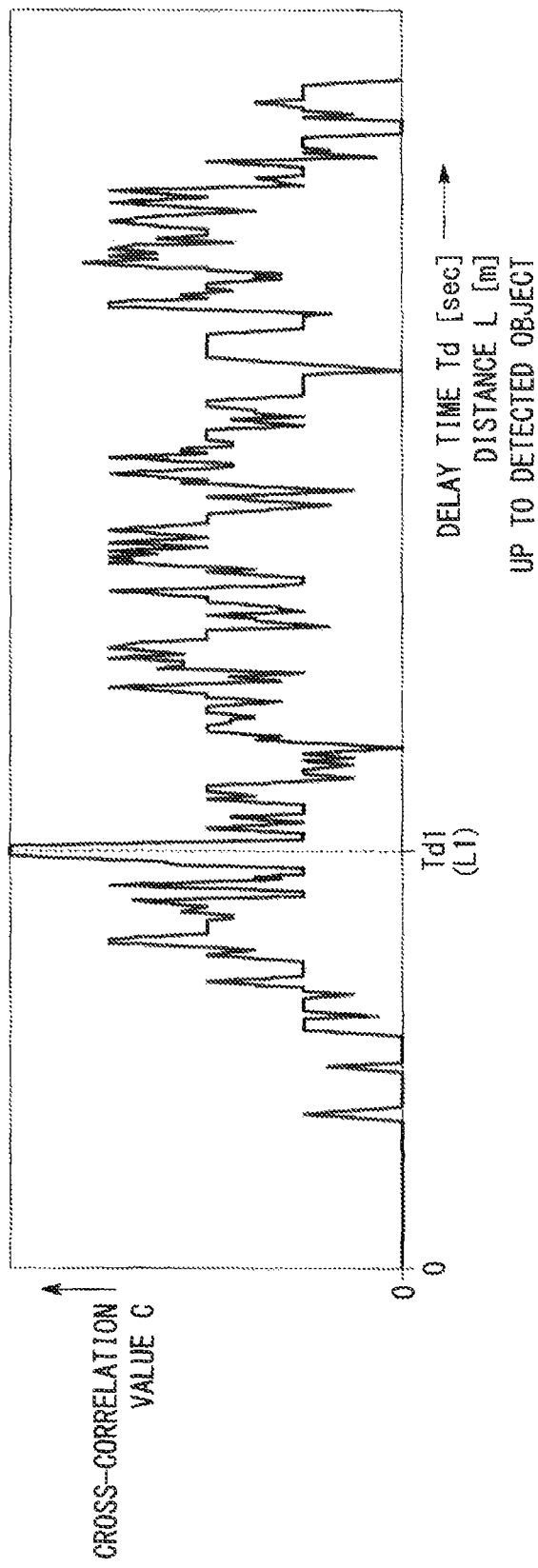
FIG. 13 is a diagram showing by way of example a relationship between a delay time from emission of a transmission wave to reception of a reflection wave and the distance up to the detected object, and the cross-correlation value.

FIG. 13 is a diagram showing by way of example the relationship between the delay time Td and the distance L, and the cross-correlation value C. As shown in FIG. 13, the cross-correlation value C becomes greatest when the delay time Td is Td1, i.e., when the distance L is L1. For this reason, the distance detector 52 judges the delay time Td as Td1, or judges the distance L as L1.

Returning to step S24 of FIG. 10, if the distance detector 52 judges that the detected object 100 does not exist within the short range (step S24: NO), then in step S26, the distance detector 52 calculates a cross-correlation value C for the long range (hereinafter referred to as a "cross-correlation value C2"), based on the pattern Pw2 (binary data) of the second transmission wave W2 and the binary data of the reflection waves Wr1, Wr2 (filter signals Sf1, Sf2). In step S27, based on the cross-correlation value C2 for the long range, the distance detector 52 calculates the distance L up to the detected object 100.

3. Control Process for Judging Failure

[3-1. Overall Process of Object Detecting Apparatus 12]

Figure 14:
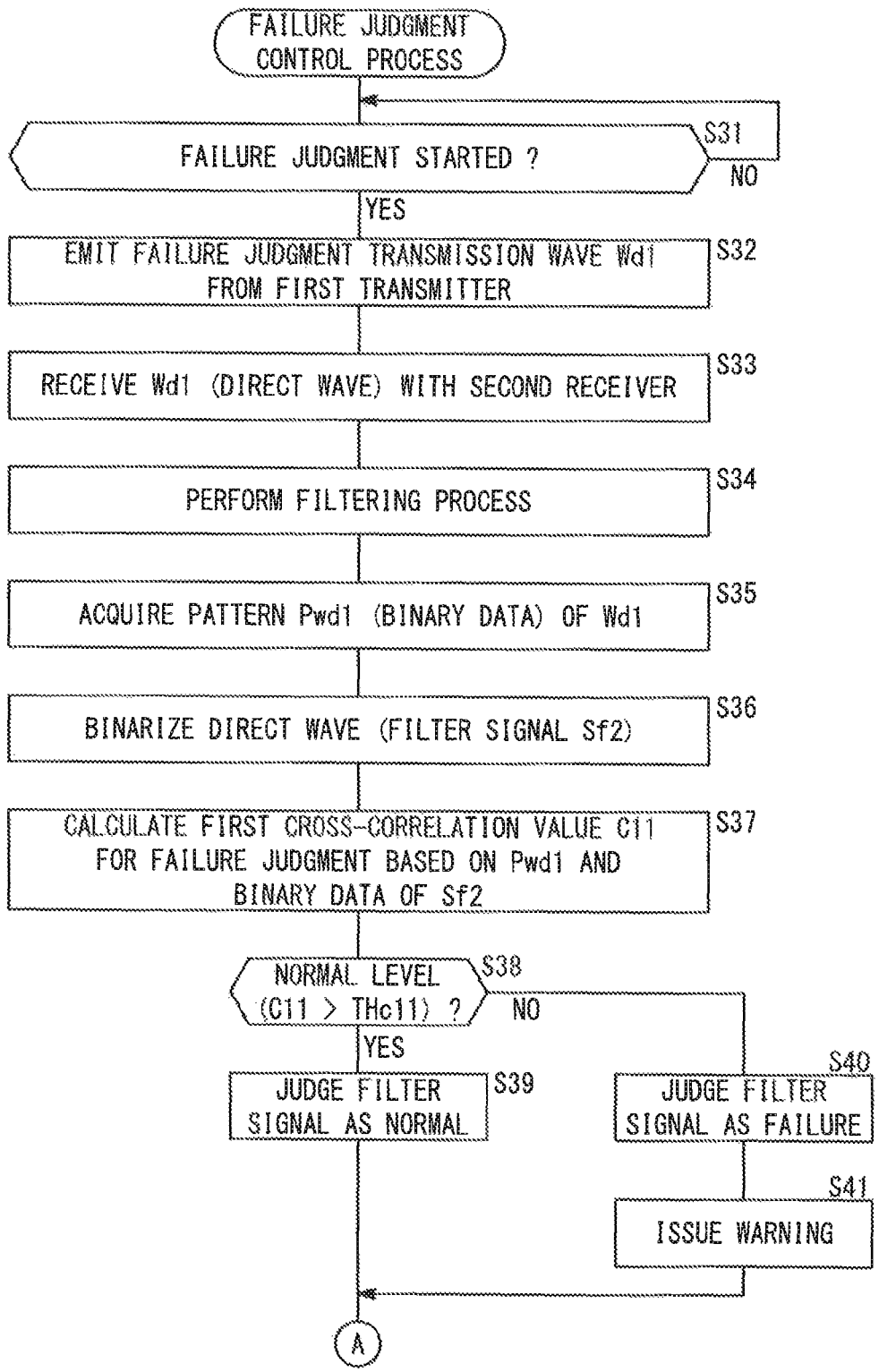
FIG. 14 is a first flowchart of a failure judgment control process of the object detecting apparatus according to the first embodiment.
Figure 15:
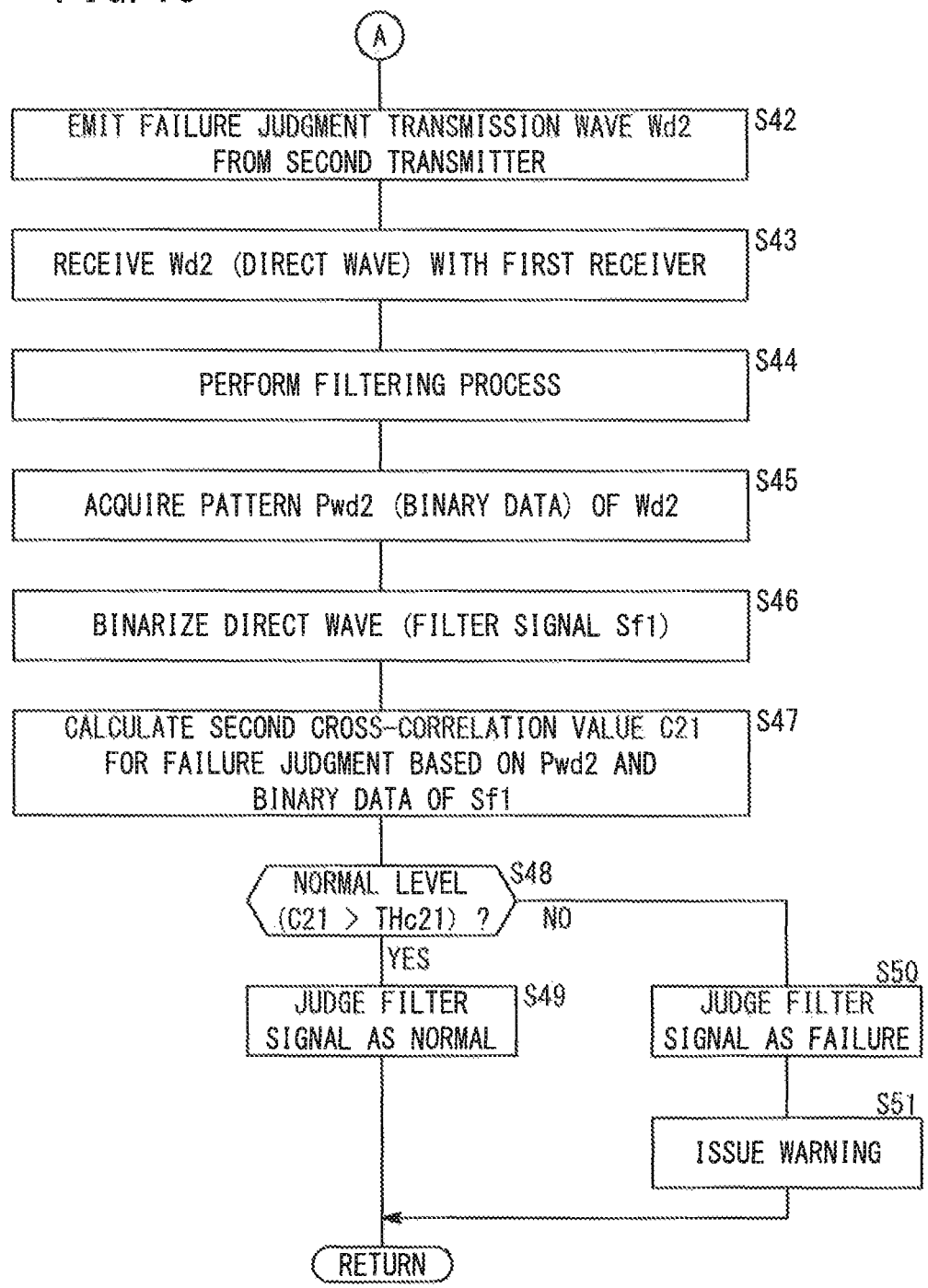
FIG. 15 is a second flowchart of the failure judgment control process of the object detecting apparatus according to the first embodiment.

FIGS. 14 and 15 are first and second flowcharts, respectively, of a failure judgment control process of the object detecting apparatus 12 according to the first embodiment. For facilitating understanding of the present invention, the ultrasonic sensor 30a will hereinafter be referred to as a "first ultrasonic sensor 30a", the transmitter 40a will be referred to as a "first transmitter 40a", and the receiver 42a will be referred to as a "first receiver 42a". Further, the ultrasonic sensor 30b will be referred to as a "second ultrasonic sensor 30b", the transmitter 40b will be referred to as a "second transmitter 40b", and the receiver 42b will be referred to as a "second receiver 42b".

In step S31 of FIG. 14, the failure judging section 54 judges whether or not a failure state judgment process (hereinafter referred to as a "failure judgment") should be started. If the failure judgment should not be started (step S31: NO), then the failure judging section 54 repeats step S31. If the failure judgment should be started (step S31: YES), then control proceeds to step S32.

In step S32, the failure judging section 54 controls the first transmitter 40a in order to emit a transmission wave Wt1 for the failure judgment (hereinafter referred to as a "failure judgment transmission wave Wd1" or a "transmission wave Wd1"). More specifically, the failure judging section 54 sends an output command Rt for the transmission wave Wd1 to the transmitter controller 50. In response to the output command Rt, the transmitter controller 50 sends a control signal Sc1 (drive signal) to the first transmitter 40a. In response to the control signal Sc1, the first transmitter 40a emits the transmission wave Wd1.

In step S33, the second receiver 42b receives the transmission wave Wd1 (direct wave) that has arrived directly from the first transmitter 40a, and supplies a reflection wave signal Sr2 to the filter 32b. In step S34, the filter 32b performs a filtering process on the reflection wave signal Sr2, and supplies a filter signal Sf2 to the distance detector 52.

In step S35, the distance detector 52 acquires a pattern Pwd1 of the failure judgment transmission wave Wd1 (transmission wave pattern signal Swd1) from the transmitter controller 50. According to the present embodiment, the pattern Pwd1 is represented by binary data, which indicates the duration Wb and the pulse burst period Cb of the pulse burst 62. For example, the period (duration Wb) during which the pulse burst 62 (burst wave) is emitted is represented by "1", and the period during which the pulse burst 62 is not emitted is represented by "0".

In step S36, the distance detector 52 binarizes the filter signal Sf2, which represents the transmission wave Wd1 as a direct wave, depending on the value (amplitude) thereof. The binarizing process is the same as the binarizing process performed in step S22 of FIG. 10.

In step S37, the distance detector 52 calculates a cross-correlation value C for the failure judgment (hereinafter referred to as a "failure judgment first cross-correlation value C11" or a "first cross-correlation value C11"), based on the pattern Pwd1 (binary data) of the transmission wave Wd1 and the binary data of the transmission wave Wd1 (filter signal Sf2) as a direct wave. The process of calculating the cross-correlation value C is the same as the calculation process performed in step S23 of FIG. 10.

In step S38, the failure judging section 54 judges whether or not the filter signal Sf2 is of a normal level, based on the first cross-correlation value C11 that was calculated in step S37. If the filter signal Sf2 is of a normal level (step S38: YES), then in step S39, the failure judging section 54 judges that the filter signal Sf2 is normal.

If the filter signal Sf2 is not of a normal level (step S38: NO), then in step S40, the failure judging section 54 judges that a failure has occurred in the filter signal Sf2. Stated otherwise, the failure judging section 54 judges that a failure has occurred in relation to the combination of the first transmitter 40a and the second receiver 42b. In step S41, the failure judging section 54 controls the warning unit 19 to issue a warning. The warning may consist of displayed information or a warning sound indicating that a failure has occurred in the combination of the first transmitter 40a and the second receiver 42b.

In steps S42 through S51, similar processing is carried out in relation to the combination of the second transmitter 40b and the first receiver 42a. More specifically, in step S42, the failure judging section 54 controls the second transmitter 40b to emit a transmission wave Wt2 for the failure judgment (hereinafter referred to as a "failure judgment transmission wave Wd2" or a "transmission wave Wd2"). The transmission wave Wd2 used in step S42 may be of the same waveform or a different waveform from the transmission wave Wd1 used in step S32.

In step S43, the first receiver 42a receives the transmission wave Wd2 (direct wave) that has arrived directly from the second transmitter 40b, and supplies a reflection wave signal Sr1 to the filter 32a. In step S44, the filter 32a performs a filtering process on the reflection wave signal Sr1, and supplies a filter signal Sf1 to the distance detector 52.

In step S45, the distance detector 52 acquires a pattern Pwd2 of the failure judgment transmission wave Wd2 (transmission wave pattern signal Swd2) from the transmitter controller 50. In step S46, the distance detector 52 binarizes the filter signal Sf1, which represents the transmission wave Wd2 as a direct wave, depending on the value (amplitude) thereof.

In step S47, the distance detector 52 calculates a cross-correlation value C for the failure judgment (hereinafter referred to as a "failure judgment second cross-correlation value C21" or a "second cross-correlation value C21"), based on the pattern Pwd2 (binary data) of the transmission wave Wd2 and the binary data of the transmission wave Wd2 (filter signal Sf1) as a direct wave.

In step S48, the failure judging section 54 judges whether or not the filter signal Sf1 is of a normal level, based on the second cross-correlation value C21 that was calculated in step S47. If the filter signal Sf1 is of a normal level (step S48: YES), then in step S49, the failure judging section 54 judges that the filter signal Sf1 is normal.

If the filter signal Sf1 is not of a normal level (step S48: NO), then in step S50, the failure judging section 54 judges that a failure has occurred in the filter signal Sf1. Stated otherwise, the failure judging section 54 judges that a failure has occurred in relation to the combination of the second transmitter 40b and the first receiver 42a. In step S51, the failure judging section 54 controls the warning unit 19 to issue a warning. The warning may consist of displayed information or a warning sound indicating that a failure has occurred in the combination of the second transmitter 40b and the first receiver 42a.

[3-2. Starting Condition for Failure Judgment (Step S31 of FIG. 14)]

According to the present embodiment, a condition for initiating the failure judgment (step S31) may be that a preset period of time has elapsed, for example. The preset period of time may range from several tens of seconds to several minutes. If the failure judgment is to be initiated, the distance detecting process (step S4 of FIG. 2) may be canceled. Alternatively, the failure judgment may be initiated while the distance detecting process continues to be performed. Further, alternatively, the failure judgment may be initiated if the preset period of time has elapsed in combination with the fact that the detected object 100 does not exist within either the short range or the long range (step S11 of FIG. 7: NO).

Since the ultrasonic sensors 30a, 30b are positioned relatively close to each other in a horizontally symmetric manner, the failure judgment is more likely to be affected by the vehicle speed V than by the detection of the distance L. Therefore, it is possible to initiate the failure judgment on the condition that the distance detecting process is being canceled due to the vehicle speed V being higher than the vehicle speed threshold value THv.

[3-3. Failure Judgment Transmission Waves Wd1, Wd2 (Step S32 of FIG. 14, Step S42 of FIG. 15)]

Figure 16:
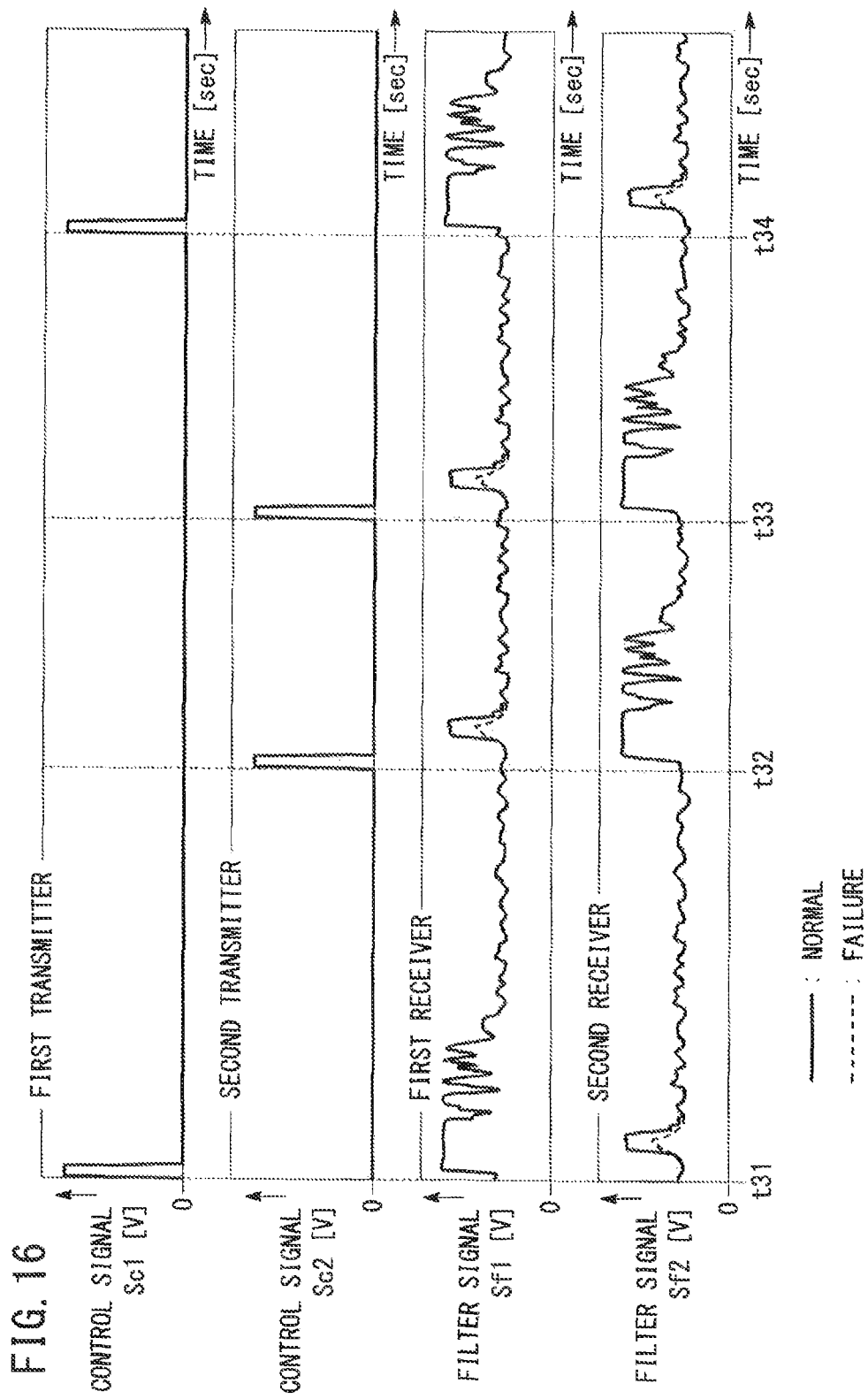
FIG. 16 is a diagram showing by way of example output signals produced by first and second transmitters and first and second receivers, in the failure judgment control process according to the first embodiment.

FIG. 16 is a diagram showing by way of example output signals produced by the first and second transmitters 40a, 40b and the first and second receivers 42a, 42b, in the failure judgment control process according to the first embodiment. It should be understood that, in order to facilitate understanding of the present invention, the filter signals Sf1, Sf2, rather than the reflection wave signals Sr1, Sr2, are used in FIG. 16 as output signals from the first and second receivers 42a, 42b. In FIG. 16 as well as in FIG. 17, which will be referred to later, the filter signals Sf1, Sf2, which are indicated by solid-line curves, are representative of normal values by way of example, whereas the filter signals Sf1, Sf2, which are indicated by broken-line curves, are representative of failure values by way of example.

As shown in FIG. 16, at time t31, a control signal Sc1 is supplied to the first transmitter 40a, thereby causing the first transmitter 40a to emit a transmission wave Wd1. At the same time, the first receiver 42a produces an output signal having a waveform that corresponds to the transmission wave Wd1 and the reverberation of the transmission wave Wd1.

After a slight delay from the output signal of the first receiver 42a, the second receiver 42b produces an output signal having a waveform that corresponds to the transmission wave Wd1 from the first transmitter 40a and the reverberation of the transmission wave Wd1. More specifically, the second receiver 42b produces a reflection wave signal Sr2, which corresponds to the transmission wave Wd1 and the reverberation thereof that is transmitted directly to the second receiver 42b from the first transmitter 40a. The delay in the output signal of the second receiver 42b with respect to the output signal of the first receiver 42a depends on the distance between the first transmitter 40a and the second receiver 42b.

Similarly, at time t32, a control signal Sc2 is supplied to the second transmitter 40b, thereby causing the second transmitter 40b to emit a transmission wave Wd2. At the same time, the second receiver 42b produces an output signal having a waveform that corresponds to the transmission wave Wd2 and the reverberation of the transmission wave Wd2.

After a slight delay from the output signal of the second receiver 42b, the first receiver 42a produces an output signal having a waveform that corresponds to the transmission wave Wd2 from the second transmitter 40b and the reverberation of the transmission wave Wd2. More specifically, the first receiver 42a produces a reflection wave signal Sr1, which corresponds to the transmission wave Wd2 and the reverberation thereof that is transmitted directly to the first receiver 42a from the second transmitter 40b. The delay in the output signal of the first receiver 42a with respect to the output signal of the second receiver 42b depends on the distance between the second transmitter 40b and the first receiver 42a.

The first and second transmitters 40a, 40b and the first and second receivers 42a, 42b operate similarly at times t33 and t34.

As a result, the second receiver 42b produces a reflection wave signal Sr2 corresponding to the transmission wave Wd1 and the reverberation of the transmission wave Wd1, whereas the first receiver 42a produces a reflection wave signal Sr1 corresponding to the transmission wave Wd2 and the reverberation of the transmission wave Wd2. As described above, using the cross-correlation values C11, C21, which are based on the reflection wave signals Sr1, Sr2, it is possible to judge whether or not the reflection wave signals Sr1, Sr2 are indicative of a failure, i.e., whether a failure has occurred in the combination of the second transmitter 40b and the first receiver 42a, or in the combination of the first transmitter 40a and the second receiver 42b.

The failure referred to above signifies not only a malfunction of one or more of the first transmitter 40a, the second transmitter 40b, the first receiver 42a, and the second receiver 42b, but may also signify a deposit of snow or mud on one or more of the first transmitter 40a, the second transmitter 40b, the first receiver 42a, and the second receiver 42b.

If, on the basis of a signal from an external communication system such as a navigation system or the like, it can be predicted that snow may possibly be deposited on the first transmitter 40a, the second transmitter 40b, the first receiver 42a, and the second receiver 42b, then heaters (not shown) may be positioned near the first transmitter 40a, the second transmitter 40b, the first receiver 42a, and the second receiver 42b. In this case, if a failure is judged to have occurred, the heaters may be energized to melt the deposited snow.

The failure judgment transmission waves Wd1, Wd2 according to the present embodiment have a waveform that is similar to the first transmission wave W1 for the short range, for example. More specifically, the transmission waves Wd1, Wd2 have a frequency f2, which is lower than the resonant frequency f1 of the oscillators of the transmitters 40a, 40b. Therefore, even though the ultrasonic sensors 30a, 30b are positioned relatively close to each other, the ultrasonic sensors 30a, 30b are less susceptible to reverberation. Furthermore, since the frequency f2 is lower than the resonant frequency f1, the reverberation time is relatively short. Therefore, the distance detecting process is less adversely affected. For example, the period of time during which the distance detecting process is canceled may be shortened.

In view of the fact that the distance between the first transmitter 40a and the second receiver 42b, and the distance between the second transmitter 40b and the first receiver 42a are shorter than a relatively far area (e.g., less than 4 m) in the short range, the frequency of the transmission waves Wd1, Wd2 may be lower than the frequency f2.

[3-4. Calculation of Cross-Correlation Values C11, C21 and Judgment of Normal Level (Steps S37, S38 of FIG. 14 and Steps S47, S48 of FIG. 15)]

The ultrasonic sensors 30a, 30b are fixed to the vehicle 10. Therefore, the ultrasonic sensors 30a, 30b are in a fixed positional relationship with respect to each other. If the combination of the first transmitter 40a and the second receiver 42b and the combination of the second transmitter 40b and the first receiver 42a are normal, then the cross-correlation values C11, C21 fall within a certain range.

According to the present embodiment, a failure of the combination of the first transmitter 40a and the second receiver 42b, and a failure of the combination of the second transmitter 40b and the first receiver 42a are judged to have occurred by judging whether or not the cross-correlation values C11, C21 exceed respective threshold values (hereinafter referred to as "correlation value threshold values THc11, THc21").

As described above, since the ultrasonic sensors 30a, 30b are fixed to the vehicle 10, the distance between the ultrasonic sensors 30a, 30b is identified. When the distance detector 52 according to the present embodiment calculates the cross-correlation values C11, C21, a processing range, i.e., a range of the shift number 1 in equation (2), is limited in order to reduce the processing burden on the distance detector 52.

Figure 17:
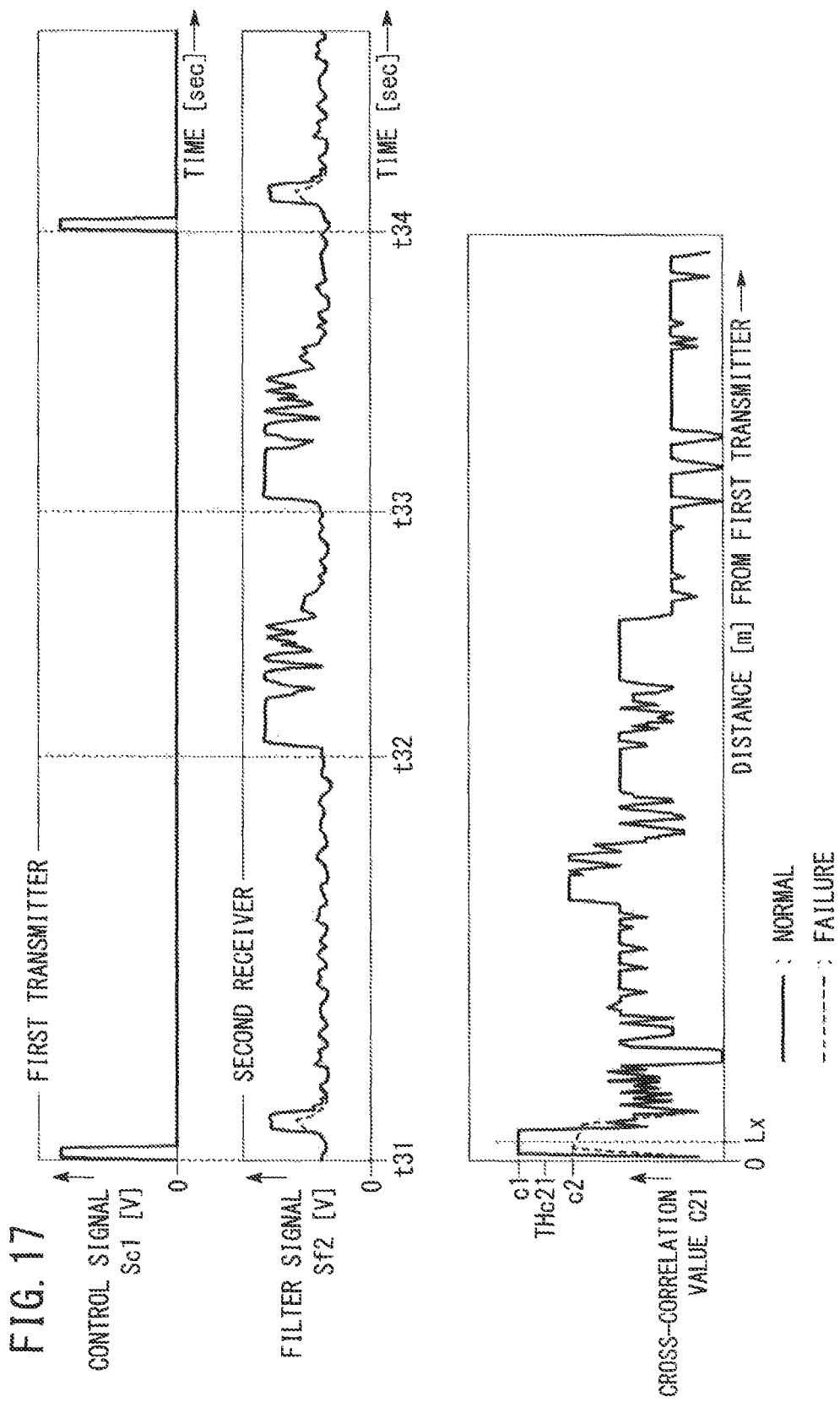
FIG. 17 is a diagram showing by way of example a relationship between the output signals produced by the first transmitter and the second receiver and the cross-correlation value, in the failure judgment control process according to the first embodiment.

FIG. 17 is a diagram showing by way of example a relationship between the output signals produced by the first transmitter 40a and the second receiver 42b and the second cross-correlation value C21, in the failure judgment control process according to the present embodiment. The output signals of the first transmitter 40a and the second receiver 42b in FIG. 17 are the same as the output signals shown in FIG. 16.

According to the present embodiment, as shown in FIG. 17, a threshold value THc21 is established for the second cross-correlation value C21 for judging the occurrence of a failure. If the first transmitter 40a and the second receiver 42b are normal, then the second cross-correlation value C21 for the distance Lx from the first transmitter 40a to the second receiver 42b is a value c1, for example, which exceeds the threshold value THc21. Accordingly, the first transmitter 40a and the second receiver 42b are judged as being normal.

On the other hand, if a failure occurs in the first transmitter 40a and the second receiver 42b, the second cross-correlation value C21 for the distance Lx from the first transmitter 40a to the second receiver 42b becomes a value c2, which is lower than the value c1, for example, and hence is less than the threshold value THc21. Accordingly, it is judged that a failure has occurred in the first transmitter 40a and the second receiver 42b.

4. Advantages of the First Embodiment

According to the first embodiment, as described above, a failure of the first transmitter 40a or the second receiver 42b is judged to have occurred using the output signal (reflection wave signal Sr2) of the second receiver 42b, which corresponds to the transmission wave Wd1 that is transmitted directly from the first transmitter 40a to the second receiver 42b. Therefore, in an arrangement having a plurality of ultrasonic sensors 30a, 30b (transmission and reception units or contactless range detection sensors), it is possible to easily detect a failure in each of the ultrasonic sensors 30a, 30b.

According to the first embodiment, the failure judging section 54 calculates a second cross-correlation value C21 based on the drive signal Sc1, which is supplied to the first transmitter 40a, and the output signal (reflection wave signal Sr2), which is output from the second receiver 42b. If the calculated second cross-correlation value C21 does not exceed the threshold value THc21, i.e., does not fall within a stored range of normal values, the failure judging section 54 judges that a failure has occurred in the first transmitter 40a or the second receiver 42b. Therefore, by using the cross-correlation value C21, it is possible to make a relatively accurate failure judgment.

According to the first embodiment, the failure judging section 54 limits the processing range for the second cross-correlation value C21 to a range which is set depending on the distance between the first transmitter 40a and the second receiver 42b. Therefore, the processing burden can be reduced.

According to the first embodiment, when the transmitters 40a, 40b emit transmission waves Wt1, Wt2 in order to enable the distance detector 52 to detect the distance L up to the detected object 100, the transmitters 40a, 40b emit the transmission waves Wt at the same frequency as the resonant frequency f1 of the oscillators of the ultrasonic sensors 30a, 30b. Further, when the transmitters 40a, 40b emit transmission waves Wd1, Wd2 in order to enable the failure judging section 54 to judge the occurrence of a failure, the transmitters 40a, 40b emit the transmission waves Wd1, Wd2 at the frequency f2, which is lower than the resonant frequency f1. Therefore, adverse effects that reverberation may have on the failure judgment control process are reduced, so that the failure judging section 54 can judge the occurrence of a failure with increased accuracy.

B. Second Embodiment

1. Arrangement (Differences from the First Embodiment)

An object detecting apparatus according to a second embodiment of the present invention has the same hardware as the object detecting apparatus according to the first embodiment. Components of the object detecting apparatus according to the second embodiment, which are identical to those of the object detecting apparatus according to the first embodiment, are denoted by identical reference characters, and such features will not be described in detail below. Further, the object detecting apparatus 12 according to the second embodiment performs the same normal control process (FIG. 2) as the object detecting apparatus 12 according to the first embodiment.

The object detecting apparatus 12 according to the first embodiment judges the occurrence of a failure by comparing the cross-correlation values C11, C21 with the threshold values THc11, THc21. However, according to the second embodiment, the object detecting apparatus 12 judges the occurrence of a failure by comparing the cross-correlation values C11, C21 with each other.

2. Control Process for Failure Judgment

[2-1. Overall Process of Object Detecting Apparatus 12]

Figure 18:
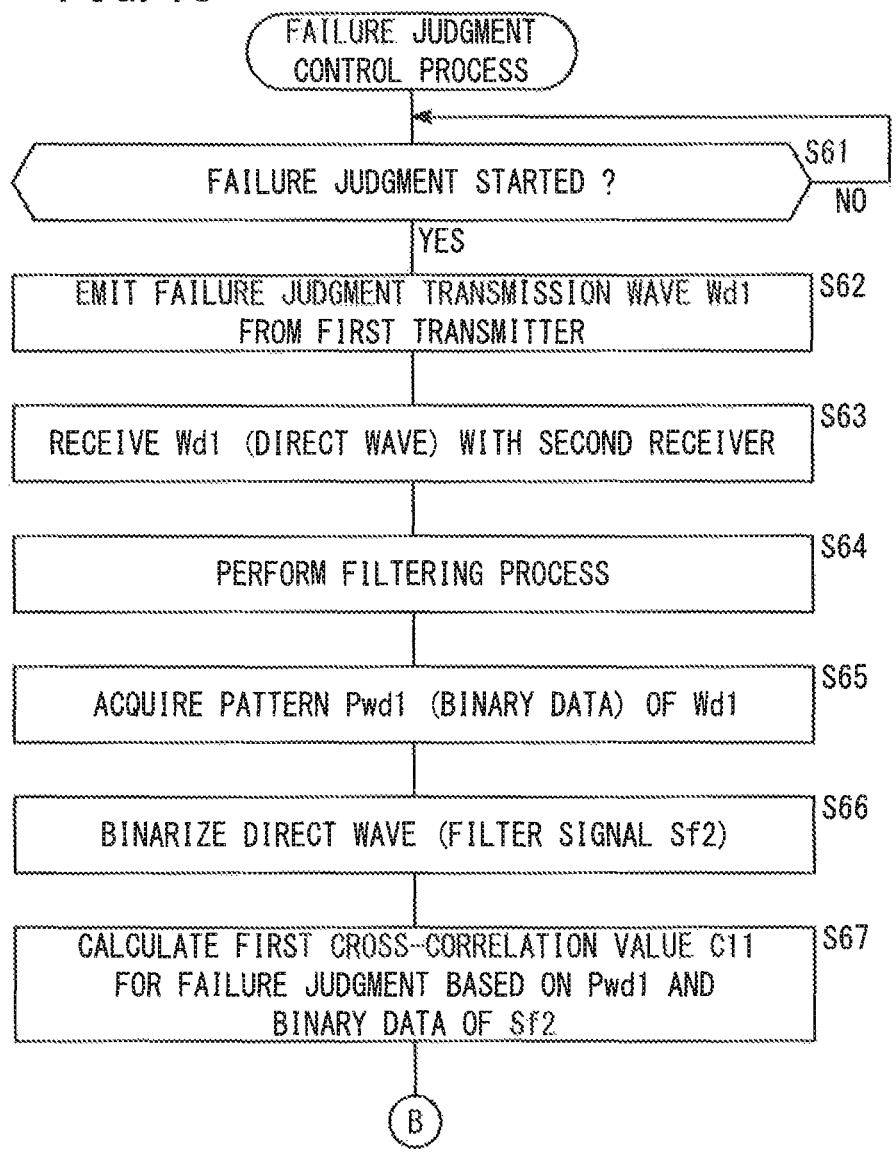
FIG. 18 is a first flowchart of a failure judgment control process of an object detecting apparatus according to a second embodiment of the present invention.
Figure 19:
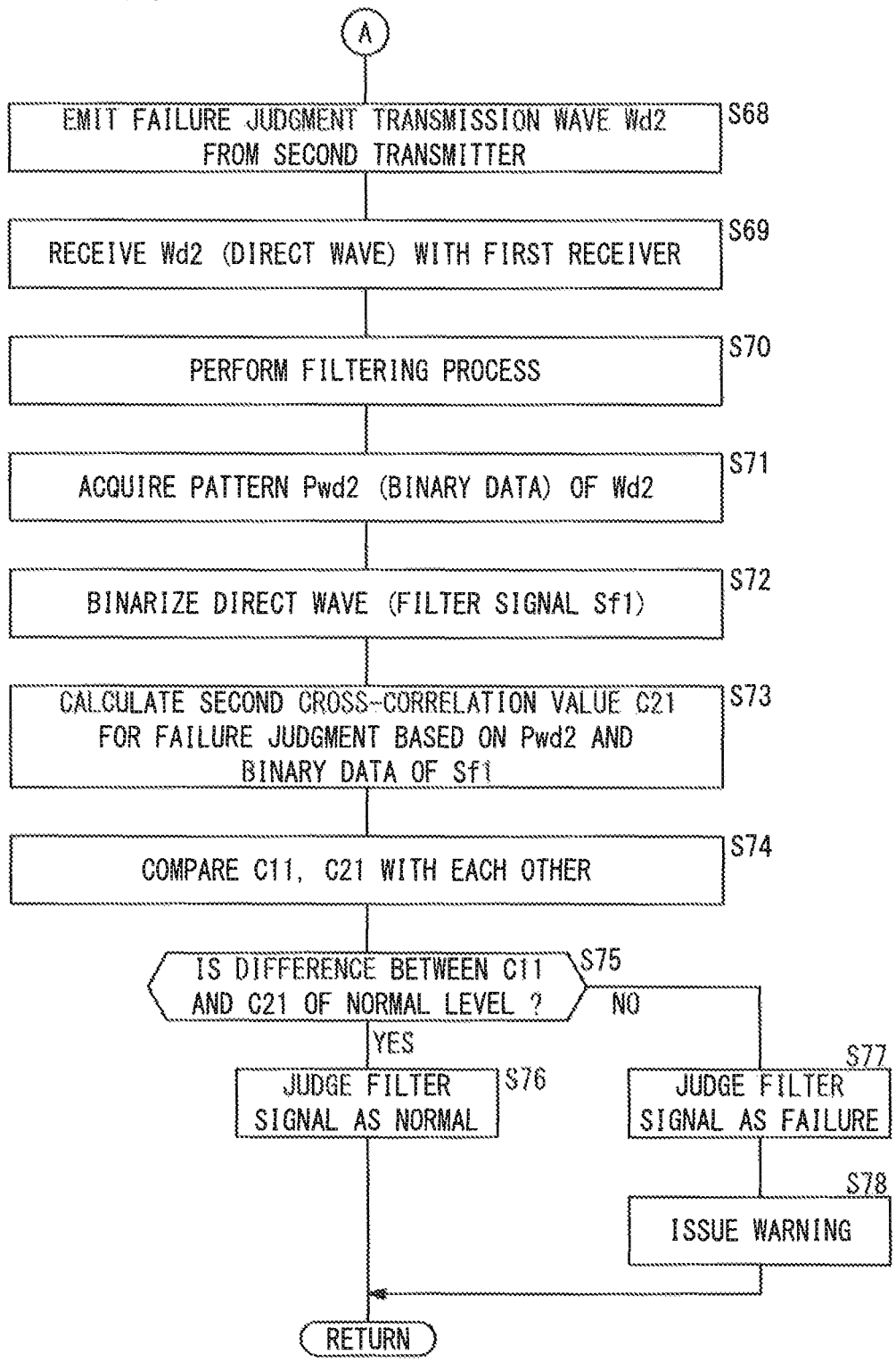
FIG. 19 is a second flowchart of the failure judgment control process of the object detecting apparatus according to the second embodiment of the present invention.

FIGS. 18 and 19 are first and second flowcharts, respectively, of a failure judgment control process of the object detecting apparatus 12 according to the second embodiment. Steps S61 through S67 of FIG. 18 and steps S68 through S73 of FIG. 19 are identical to steps S31 through S37 of FIG. 14 and steps S42 through S47 of FIG. 15.

In step S74 of FIG. 19, the failure judging section 54 compares the first cross-correlation value C11 and the second cross-correlation value C21 with each other, and determines whether or not there is a difference between the first cross-correlation value C11 and the second cross-correlation value C21.

In step S75, the failure judging section 54 judges whether or not the difference that was determined in step S74 is of a normal level. If the difference is of a normal level (step S75: YES), then control proceeds to step S76. If the difference is not of a normal level (step S75: NO), then control proceeds to step S77.

Steps S76 through S78 are identical to steps S39 through S41 of FIG. 14 or steps S49 through S51 of FIG. 15. However, as described later, the failure that is capable of being judged according to the second embodiment differs from the failure that is capable of being judged according to the first embodiment.

[2-2. Comparison of Cross-Correlation Values C11, C21 (Step S74 of FIG. 19)]

The ultrasonic sensors 30a, 30b are fixed to the vehicle 10. Therefore, the ultrasonic sensors 30a, 30b are in a fixed positional relationship with respect to each other. If the combination of the first transmitter 40a and the second receiver 42b and the combination of the second transmitter 40b and the first receiver 42a are normal, then the difference between the cross-correlation values C11, C21 falls within a certain range. According to the present embodiment, a failure of the combination of the first transmitter 40a and the second receiver 42b, and a failure of the combination of the second transmitter 40b and the first receiver 42a are judged to have occurred by judging the difference between the cross-correlation values C11, C21.

For example, the failure judging section 54 judges whether or not the difference $\Delta C$ between the cross-correlation values C11, C21 exceeds a threshold value (hereinafter referred to as a "correlation value threshold value TH$\Delta C$") that is used for judging the occurrence of a failure. If the difference $\Delta C$ is smaller than the correlation value threshold value TH$\Delta C$, the failure judging section 54 judges that either one of the ultrasonic sensors 30a, 30b, or more specifically, either one of the combination of the first transmitter 40a and the second receiver 42b and the combination of the second transmitter 40b and the first receiver 42a, is functioning normally.

On the other hand, if the difference $\Delta C$ is greater than the correlation value threshold value THC, then the failure judging section 54 judges that a failure has occurred in either one of the ultrasonic sensors 30a, 30b. In this case, the failure judging section 54 may judge that a failure has occurred in one of the ultrasonic sensors 30a, 30b, which corresponds to a smaller one of the cross-correlation values C11, C21.

A ratio between the cross-correlation values C11, C21 or the like may be used instead of the difference ΔC.

3. Advantages of the Second Embodiment

The second embodiment offers the following advantages, in addition to or instead of the advantages of the first embodiment.

According to the second embodiment, a failure of the first ultrasonic sensor 30a (first transmission and reception unit) or the second ultrasonic sensor 30b (second transmission and reception unit) is judged to have occurred using the first output signal (reflection wave signal Sr1) of the first receiver 42a, which corresponds to the transmission wave Wd2 that is transmitted directly from the second transmitter 40b to the first receiver 42a, and the second output signal (reflection wave signal Sr2) of the second receiver 42b, which corresponds to the transmission wave Wd1 that is transmitted directly from the first transmitter 40a to the second receiver 42b. Therefore, in an arrangement having a plurality of ultrasonic sensors 30a, 30b (transmission and reception units or contactless range detection sensors), it is possible to easily detect a failure in each of the ultrasonic sensors 30a, 30b.

According to the second embodiment, the failure judging section 54 calculates a first cross-correlation value C11 based on the drive signal Sc2, which is supplied to the second transmitter 40b, and the reflection wave signal Sr1 (first output signal) which is output from the first receiver 42a. The failure judging section 54 also calculates a second cross-correlation value C21 based on the drive signal Sc1, which is supplied to the first transmitter 40a, and the reflection wave signal Sr2 (second output signal) which is output from the second receiver 42b. If the result of the comparison (difference) between the calculated first cross-correlation value C11 and the calculated second cross-correlation value C21 does not fall within a normal range (step S75 of FIG. 19: NO), then the failure judging section 54 judges that a failure has occurred in either one of the ultrasonic sensors 30a, 30b. Therefore, by using the cross-correlation values C11, C21, it is possible to make a relatively accurate failure judgment.

According to the present embodiment, the failure judging section 54 limits the processing range for the first cross-correlation value C11 to a range which is set depending on the distance between the second transmitter 40b and the first receiver 42a. The failure judging section 54 also limits the processing range for the second cross-correlation value C21 to a range which is set depending on the distance between the first transmitter 40a and the second receiver 42b. Therefore, the processing burden can be reduced.

C. Modifications

The present invention is not limited to the above embodiments. Various alternative arrangements may be employed based on the disclosure of the present description. For example, the present invention may employ the following arrangements.

1. Objects in which the Object Detecting Apparatus can be Incorporated

In the above embodiments, the object detecting apparatus 12 is incorporated in the vehicle 10. However, the object detecting apparatus 12 may be incorporated in other objects. For example, the object detecting apparatus 12 may be incorporated in mobile objects such as ships, aircrafts, etc. Alternatively, the object detecting apparatus 12 may be incorporated in robots, security-related monitoring apparatus, or electric home appliances.

2. Arrangement of Object Detecting Apparatus 12

[2-1. Overall Arrangement]

In the above embodiments, the distance L represented by the output signal from the object detecting apparatus 12 is used in the vehicle behavior stabilizing ECU 20 and the EPS ECU 22. However, the distance L may also be used for other purposes. For example, the distance L may be used in carrying out a parking assistance procedure or a start-by-mistake prevention procedure for the vehicle 10.

In the above embodiments, the object detecting apparatus 12 employs the ultrasonic sensors 30a, 30b in which transmission waves Wt1, Wt2 and reflection waves Wr1, Wr2, which are ultrasonic waves, are used. However, an arrangement having a plurality of transmission and reception units may employ sensors such as millimeter-wave radar sensors, laser radar sensors, etc., for easily detecting a failure in the transmission and reception units.

In the above embodiments, the ultrasonic sensors 30a, 30b are identical to each other. However, an arrangement having a plurality of transmission and reception units may employ ultrasonic sensors that differ from each other, for thereby easily detecting a failure in the transmission and reception units.

The ultrasonic sensors 30a, 30b according to the above embodiment have an arrangement (reflective type) in which the receivers 42a, 42b receive the reflection waves Wr1, Wr2, which are produced from the transmission waves Wt1, Wt2 emitted from the transmitters 40a, 40b. However, the ultrasonic sensors 30a, 30b are not limited to the above arrangement. Alternatively, the ultrasonic sensors 30a, 30b may be arranged such that the transmission wave Wd1 emitted from the first transmitter 40a is received as a direct wave by the second receiver 42b, or such that the transmission wave Wd2 emitted from the second transmitter 40b is received as a direct wave by the first receiver 42a. For example, the ultrasonic sensors 30a, 30b may be of a transmissive type rather than a reflective type.

[2-2. Arrangement of Filters 32a, 32b and Object Detecting ECU 34]

In the above embodiments, it is assumed that the filters 32a, 32b comprise analog circuits, whereas the transmitter controller 50, the distance detector 52, and the failure judging section 54 comprise digital circuits. However, the filters 32a, 32b may comprise digital circuits, and the transmitter controller 50, the distance detector 52, and the failure judging section 54 may partially comprise analog circuits.

[2-3. Control Process of Object Detecting ECU 34]

In the above embodiments, the frequency (burst frequency) of the second transmission wave W2 is equal to the resonant frequency f1, and the frequency of the first transmission wave W1 and the frequency (burst frequency) of the failure judgment transmission waves Wd1, Wd2 are equal to the frequency f2, which is lower than the resonant frequency f1 (see FIG. 3, etc.). However, insofar as a failure of the first transmitter 40a or the second receiver 42b can be judged to have occurred using the transmission waves Wd1, Wd2, which are emitted as direct waves from the transmitters 40a, 40b, for example, the frequencies (burst frequencies) of the first transmission wave W1, the second transmission wave W2, and the failure judgment transmission waves Wd1, Wd2 may be equal to each other.

In the above embodiments, the duration Wb of the pulse burst 62 of the second transmission wave W2 for the long range is greater than the duration Wb of the pulse burst 62 of the first transmission wave W1 for the short range (FIG. 3). However, insofar as a failure of the first transmitter 40a or the second receiver 42b can be judged to have occurred using the transmission waves Wd1, Wd2, which are emitted as direct waves from the transmitters 40a, 40b, for example, the durations Wb of the first transmission wave W1, the second transmission wave W2, and the failure judgment transmission waves Wd1, Wd2 may be identical to each other.

In the above embodiments, the cross-correlation values C11, C21 are calculated (steps S37, S47, S67, S73) during the failure judgment control process (FIGS. 14, 15, 18, 19). However, insofar as a failure of the first transmitter 40a or the second receiver 42b is judged to have occurred using the transmission waves Wd1, Wd2, which are emitted as direct waves from the transmitters 40a, 40b, for example, other processes may be employed. For example, the failure judgment control process may determine the occurrence of a failure by judging whether or not the amplitude of the filter signals Sf1, Sf2 exceeds an amplitude threshold value. According to such a modification, the transmitter controller 50, which performs the cross-correlation process, is not required to send the transmission wave pattern signals Swd1, Swd2 to the failure judging section 54. However, in the failure judgment control process, the transmitter controller 50 is required to produce the transmission wave pattern signals Swd1, Swd2 in order to recognize the output timings of the transmission waves Wd1, Wd2.

According to the first embodiment, a failure judgment is made with respect to a combination of the first transmitter 40a and the second receiver 42b, as well as with respect to a combination of the second transmitter 40b and the first receiver 42a (FIGS. 14 and 15). However, a failure judgment may be made with respect to either one of a combination of the first transmitter 40a and the second receiver 42b, and a combination of the second transmitter 40b and the first receiver 42a.

In the above-described embodiments, a detailed illustration of the distance detecting process is shown by way of example in FIG. 10. However, insofar as attention is focused on the failure judging control process, the distance detecting process is not limited to the illustrated details.

What is claimed is:

1. An object detecting apparatus comprising:
a first transmission and reception unit and a second transmission and reception unit each having a transmitter configured to emit a transmission wave to detect an object in a detection area, and a receiver configured to receive a reflection wave reflected from the object when the transmission wave is applied to the object;
a distance detector configured to detect a distance up to the object based on a delay time from a time at which the transmitter emits the transmission wave to a time at which the receiver receives the reflection wave, with respect to each of the first transmission and reception unit and the second transmission and reception unit; and
a failure judging section configured to judge whether a failure of the first transmission and reception unit and the second transmission and reception unit has occurred,
wherein the failure judging section judges that a failure has occurred in a first transmitter, which is the transmitter of the first transmission and reception unit, or a second receiver, which is the receiver of the second transmission and reception unit, based on a determination that an output signal produced from the second receiver based on the transmission wave that is transmitted directly from the first transmitter to the second receiver is different from a predetermined threshold value through comparison therewith, and
wherein each of the first transmission and reception unit and the second transmission and reception unit is au ultrasonic sensor;
in a case that the transmitter emits the transmission wave, which is used by the distance detector to detect the distance up to the object, the transmitter emits the transmission wave at same frequency as a resonant frequency of an oscillator of the ultrasonic sensor; and
in a case that the transmitter emits the transmission wave, which is used by the failure judging section to judge the occurrence of a failure, the transmitter emits the transmission wave at a frequency lower than the resonant frequency.

2. The object detecting apparatus according to claim 1, wherein the failure judging section:
calculates a cross-correlation value based on a drive signal supplied to the first transmitter and the output signal from the second receiver; and
judges that a failure has occurred in the first transmitter or the second receiver based on a determination that the calculated cross-correlation value does not fall within a range of the predetermined threshold value.

3. The object detecting apparatus according to claim 2, wherein the failure judging section limits a processing range for the cross-correlation value to a range which is set depending on a distance between the first transmitter and the second receiver.

4. An object detecting apparatus comprising:
a first transmission and reception unit and a second transmission and reception unit each having a transmitter configured to emit a transmission wave to detect an object in a detection area, and a receiver configured to receive a reflection wave reflected from the object when the transmission wave is applied to the object;
a distance detector configured to detect a distance up to the object based on a delay time from a time at which the transmitter emits the transmission wave to a time t which the receiver receives the reflection wave, with respect to each of the first transmission and reception unit and the second transmission and reception unit; and
a failure judging section configured to judge whether a failure of the first transmission and reception unit and the second transmission and reception unit has occurred,
wherein the failure judging section:
acquires a first output signal produced from a first receiver, which is the receiver of the first transmission and reception unit, based on the transmission wave that is transmitted directly from a second transmitter, which is the transmitter of the second transmission and reception unit, to the first receiver;
acquires a second output signal produced from a second receiver, which is the receiver of the second transmission and reception unit, based on the transmission wave that is transmitted directly from a first transmitter, which is the transmitter of the first transmission and reception unit, to the second receiver; and
judges that a failure has occurred in the first transmission and reception unit or the second transmission and reception unit based on a result of a comparison between the first output signal and the second output signal not falling within a predetermined range.

5. The object detecting apparatus according to claim 4, wherein the failure judging section:
 calculates a first cross-correlation value based on a drive signal supplied to the second transmitter and the first output signal from the first receiver;
 calculates a second cross-correlation value based on a drive signal supplied to the first transmitter and the second output signal from the second receiver; and
 judges that a failure has occurred in the first transmission and reception unit or the second transmission and reception unit based on a result of a comparison between the calculated first cross-correlation value and the calculated second cross-correlation value not falling within the predetermined range.

6. The object detecting apparatus according to claim 5, wherein the failure judging section:
 limits a processing range for the first cross-correlation value to a range which is set depending on a distance between the second transmitter and the first receiver; and
 limits a processing range for the second cross-correlation value to a range which is set depending on a distance between the first transmitter and the second receiver.

7. The object detecting apparatus according to claim 4, wherein:
 each of the first transmission and reception unit and the second transmission and reception unit is an ultrasonic sensor;
 in a case that the transmitter emits the transmission wave, which is used by the distance detector to detect the distance up to the object, the transmitter emits the transmission wave at same frequency as a resonant frequency of an oscillator of the ultrasonic sensor; and
 in a case that the transmitter emits the transmission wave, which is used by the failure judging section to judge the occurrence of a failure, the transmitter emits the transmission wave at a frequency lower than the resonant frequency.

* * * * *